US008832724B2

(12) United States Patent
Major et al.

(10) Patent No.: US 8,832,724 B2
(45) Date of Patent: Sep. 9, 2014

(54) REMOTE STORAGE DIGITAL VIDEO RECORDER THAT SUPPORTS SHARED AND PER-SUBSCRIBER CONTENT RIGHTS

(71) Applicant: Dish Digital L.L.C., Englewood, CO (US)

(72) Inventors: Robert Drew Major, Orem, UT (US); Darren Major, Pleasant Grove, UT (US)

(73) Assignee: Dish Digital L.L.C., Englewood, CO (US)

( * ) Notice: Subject to any disclaimer, the term of this patent is extended or adjusted under 35 U.S.C. 154(b) by 0 days.

(21) Appl. No.: 13/707,044

(22) Filed: Dec. 6, 2012

(65) Prior Publication Data

US 2013/0145392 A1    Jun. 6, 2013

Related U.S. Application Data

(60) Provisional application No. 61/567,513, filed on Dec. 6, 2011.

(51) Int. Cl.

| | | |
|---|---|---|
| H04N 7/16 | (2011.01) | |
| G06F 7/04 | (2006.01) | |
| G06F 17/30 | (2006.01) | |
| H04N 21/4627 | (2011.01) | |
| H04N 9/80 | (2006.01) | |
| H04N 5/85 | (2006.01) | |
| G06F 21/62 | (2013.01) | |
| H04N 21/41 | (2011.01) | |
| H04N 21/61 | (2011.01) | |
| H04N 5/91 | (2006.01) | |
| H04N 21/218 | (2011.01) | |
| H04N 21/231 | (2011.01) | |
| H04N 21/2343 | (2011.01) | |
| H04N 7/173 | (2011.01) | |
| H04N 5/76 | (2006.01) | |
| H04N 5/782 | (2006.01) | |

(52) U.S. Cl.
CPC ............ *H04N 21/4627* (2013.01); *H04N 9/80* (2013.01); *H04N 5/782* (2013.01); *H04N 7/17336* (2013.01); *H04N 5/85* (2013.01); *H04N 7/17318* (2013.01); *H04N 7/165* (2013.01); *G06F 21/6218* (2013.01); *H04N 21/4135* (2013.01); *H04N 21/61* (2013.01); *H04N 5/91* (2013.01); *H04N 5/76* (2013.01); *H04N 21/2181* (2013.01); *H04N 21/23103* (2013.01); *H04N 21/23439* (2013.01)
USPC ...... 725/25; 725/93; 726/4; 726/28; 386/295; 386/296; 707/783; 707/784; 707/785

(58) Field of Classification Search
CPC . G06F 21/6128; G06F 21/60; G06F 21/6227; G06F 17/30233; G06F 21/6218; H04N 21/4627; H04N 21/4135; H04N 21/2181; H04N 5/85; H04N 5/782
USPC ................ 726/28, 4, 27; 725/28, 110, 25, 93; 386/295, 296; 707/783, 784, 785
See application file for complete search history.

(56) References Cited

U.S. PATENT DOCUMENTS

| | | | |
|---|---|---|---|
| 5,935,206 A | 8/1999 | Dixon et al. | |
| 7,474,832 B2 | 1/2009 | Boston et al. | |
| 7,584,495 B2 | 9/2009 | Hannuksela et al. | |
| 7,603,022 B2 | 10/2009 | Putterman et al. | |
| 7,624,412 B2 | 11/2009 | McEvilly et al. | |
| 2005/0233694 A1* | 10/2005 | Enari et al. ................... | 455/3.06 |
| 2005/0289618 A1 | 12/2005 | Hardin | |
| 2006/0020984 A1* | 1/2006 | Ban et al. ........................ | 725/97 |
| 2006/0053078 A1* | 3/2006 | Yamamoto et al. ............. | 705/52 |
| 2006/0117090 A1* | 6/2006 | Schellingerhout et al. ... | 709/217 |
| 2007/0107019 A1* | 5/2007 | Romano et al. ................. | 725/80 |
| 2007/0118857 A1* | 5/2007 | Chen et al. ...................... | 725/61 |
| 2007/0124245 A1* | 5/2007 | Sato et al. ....................... | 705/50 |
| 2008/0013919 A1 | 1/2008 | Boston et al. | |
| 2008/0092168 A1* | 4/2008 | Logan et al. .................... | 725/44 |
| 2008/0201748 A1 | 8/2008 | Hasek et al. | |
| 2008/0310825 A1 | 12/2008 | Fang et al. | |
| 2009/0074380 A1 | 3/2009 | Boston et al. | |
| 2009/0080864 A1 | 3/2009 | Rajakarunanayake | |
| 2010/0114921 A1 | 5/2010 | Bocharov et al. | |
| 2011/0173345 A1 | 7/2011 | Knox et al. | |

| | | | | |
|---|---|---|---|---|
| 2011/0296048 | A1* | 12/2011 | Knox et al. | 709/231 |
| 2012/0079546 | A1* | 3/2012 | Kalidindi et al. | 725/110 |
| 2012/0293605 | A1* | 11/2012 | Seferian et al. | 348/14.08 |
| 2012/0317655 | A1* | 12/2012 | Zhang et al. | 726/28 |
| 2013/0013688 | A1* | 1/2013 | Wang et al. | 709/204 |
| 2013/0013704 | A1 | 1/2013 | Pope et al. | |
| 2013/0089142 | A1* | 4/2013 | Begen et al. | 375/240.12 |
| 2013/0097309 | A1* | 4/2013 | Ma et al. | 709/224 |
| 2013/0111606 | A1* | 5/2013 | Gu | 726/28 |
| 2013/0145410 | A1 | 6/2013 | Major et al. | |
| 2013/0254538 | A1* | 9/2013 | Orsini et al. | 713/165 |

OTHER PUBLICATIONS

European Patent Office "International Search Report and Written Opinion" dated Jun. 7, 2013 for International Appln. No. PCT/US2012/067796.

International Searching Authority, Annex to Form PCT/ISA/206 Communication Relating to the Results of the Partial International Search, in PCT International Application No. PCT/US2012/067796, mailed Mar. 12, 2013.

T. Berners-Lee, "Hypertext Transfer Protocol—HTTP/1.1," Jun. 1999; retrieved from the Internet on Apr. 10, 2013 from http://www.w3.org/protocols, Chapters 5, 6, and 10.

USPTO, Final Office Action mailed Jan. 10, 2014 for U.S. Appl. No. 13/706,983.

USPTO, Final Office Action mailed Jan. 15, 2014 for U.S. Appl. No. 13/707,008.

USPTO, Office Action mailed Sep. 10, 2013 for U.S. Appl. No. 13/706,983.

USPTO, Office Action mailed Sep. 13, 2013 for U.S. Appl. No. 13/707,008.

USPTO, Office Action mailed Sep. 20, 2013 for U.S. Appl. No. 13/707,022.

USPTO, Office Action mailed Sep. 25, 2013 for U.S. Appl. No. 13/707,031.

Microsoft, How NTFS Works, Mar. 28, 2003, http://technet.microsoft.com/en-us/library/cc781134(v=ws.10).aspx.

U.S. Patent and Trademark Office, Notice of Allowance, mailed Mar. 4, 2014 for U.S. Appl. No. 13/707,031.

U.S. Patent and Trademark Office, Final Office Action, mailed Mar. 13, 2014 for U.S. Appl. No. 13/707,022.

U.S. Patent and Trademark Office, Notice of Allowance, mailed May 27, 2014 for U.S. Appl. No. 13/707,022.

* cited by examiner

*Primary Examiner* — Hoang-Vu A Nguyen-Ba

(74) *Attorney, Agent, or Firm* — Ingrassia Fisher & Lorenz, P.C.

(57) ABSTRACT

A remote storage digital video recorder (RS-DVR) system is disclosed. The RS-DVR system includes a network interface to communicate data between the RS-DVR system and a subscriber system via a network, a file system module coupled to the network interface, an ingest agent coupled to the file system module to receive encoded media segments that represent media content files encoded at a plurality of different bitrates; and a storage architecture coupled to the file system to store the encoded media segments, resulting in stored media segments. The RS-DVR carries out a number of functions and operations to service multiple subscribers and associated subscriber systems, such as various storage device management operations, file structure techniques, assignment of recorded media to subscribers, file system indexing, and supporting shared and per-subscriber content rights.

18 Claims, 10 Drawing Sheets

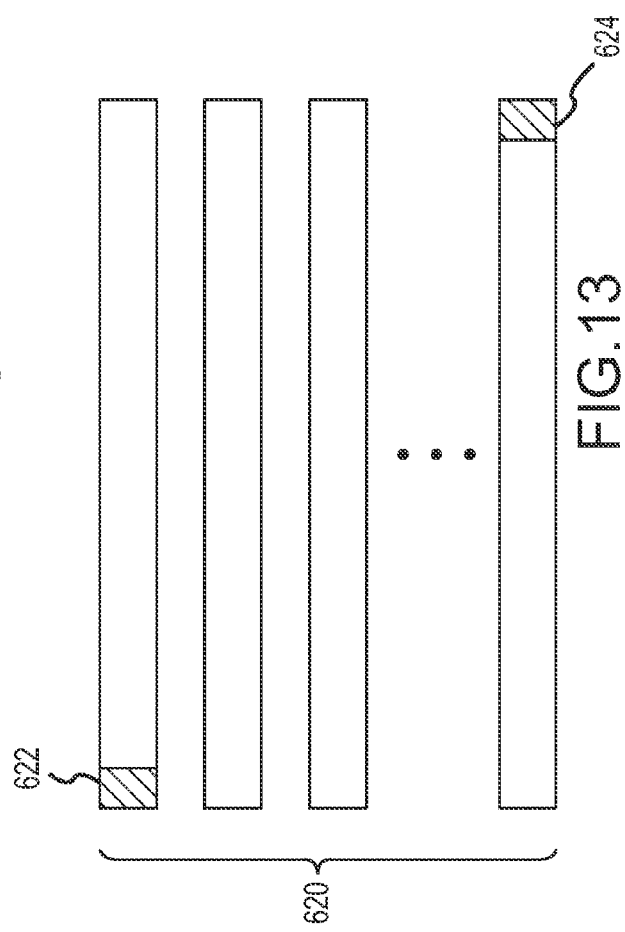

REMOTE STORAGE DIGITAL VIDEO RECORDER THAT SUPPORTS SHARED AND PER-SUBSCRIBER CONTENT RIGHTS

CROSS-REFERENCE TO RELATED APPLICATION

This application claims priority to U.S. Provisional Application Ser. No. 61/567,513, filed Dec. 6, 2011.

TECHNICAL FIELD

Embodiments of the subject matter described herein relate generally to a remote storage digital video recorder (RS-DVR) system and related operating methods.

BACKGROUND

A digital video recorder (DVR) can store a digital representation of a video program for subsequent playback. Traditionally, DVRs have been purchased or leased by customers for personal use at the customer premises. For example, a cable or satellite television subscriber might have a DVR at the home to accommodate recording of broadcast programs delivered by the cable or satellite television system. A DVR may be provided as a standalone unit or it may be integrated into another component, such as a set top box for a cable or satellite television system.

An RS-DVR system can be utilized as an alternative to traditional DVRs that must be deployed and located at the customer site. An RS-DVR system can remotely provide content recording and playback capabilities to any number of subscribers and end users (similar to a video-on-demand system). In practice, therefore, an RS-DVR system can communicate with a plurality of different subscriber systems via a data communication network.

An RS-DVR system should be able to deliver digital media content in a reliable manner over managed or unmanaged networks under various degrees of congestion. To facilitate this, it would be desirable to have an RS-DVR system that is capable of supporting multiple bitrate digital media content. Furthermore, other desirable features and characteristics will become apparent from the subsequent detailed description and the appended claims, taken in conjunction with the accompanying drawings and the foregoing technical field and background.

BRIEF SUMMARY

An embodiment of an RS-DVR system is provided here. The RS-DVR system includes a network interface to communicate data between the RS-DVR system and a subscriber system via a network, a file system module coupled to the network interface, an ingest agent coupled to the file system module to receive encoded media segments that represent media content files encoded at a plurality of different bitrates, and a storage architecture coupled to the file system to store the encoded media segments, resulting in stored media segments. The network interface, the file system module, and the storage architecture cooperate to provide the stored media segments to the subscriber system for presentation using at least one of the plurality of different bitrates.

Also provided is an embodiment of a method of operating an RS-DVR system that supports a subscriber system via data communication over a network. The method involves receiving, at the RS-DVR system, encoded media segments that represent a media content file encoded at a plurality of different bitrates, along with an instruction to record the media content file on behalf of a subscriber. In response to receiving the instruction, the method stores the encoded media segments in a storage architecture of the RS-DVR system, resulting in stored media segments.

Also provided is an embodiment of a method of operating an RS-DVR system that supports subscriber systems via data communication over a network. The method involves receiving, at the RS-DVR system, encoded media segments that represent a media content file encoded at a plurality of different bitrates, wherein the encoded media segments include a respective set of encoded media segments corresponding to each of the plurality of different bitrates. The method also receives, at the RS-DVR system, a first instruction to record the media content file on behalf of a first subscriber. In response to receiving the first instruction, the method stores a first instantiation of the encoded media segments in a storage architecture of the RS-DVR system, resulting in a first group of stored media segments. The method continues by receiving, at the RS-DVR system, a second instruction to record the media content file on behalf of a second subscriber. In response to receiving the second instruction, the method stores a second instantiation of the encoded media segments in a storage architecture of the RS-DVR system, resulting in a second group of stored media segments.

Another embodiment of an RS-DVR system is also provided. The RS-DVR system includes a network interface to communicate data between the RS-DVR system and a subscriber system via a network, a file system module coupled to the network interface, and an ingest agent coupled to the file system module to receive encoded media segments that represent a media content file encoded at a plurality of different bitrates. The encoded media segments include a respective set of encoded media segments corresponding to each of the plurality of different bitrates, and each of the encoded media segments has a time range relative to the media content file. The RS-DVR system also includes a plurality of memory storage devices coupled to the file system to store the encoded media segments in accordance with a distribution scheme influenced by the plurality of different bitrates and time ranges of the encoded media segments.

Also provided is a related method of operating an RS-DVR system that supports a subscriber system via data communication over a network. The method involves receiving, at the RS-DVR system, encoded media segments that represent a media content file encoded at a plurality of different bitrates. The encoded media segments include a respective set of encoded media segments corresponding to each of the plurality of different bitrates, and each of the encoded media segments has a time range relative to the media content file. The method continues by storing the encoded media segments in a plurality of memory storage devices of the RS-DVR system, wherein the storing is performed in accordance with a distribution scheme to ensure that encoded media segments having different bitrates and overlapping time ranges are not stored on a common one of the plurality of memory storage devices. After storing the encoded media segments, the method receives, at the RS-DVR system, a request for playback of the media content file, the request identifying a requested bitrate for the media content file. The method continues by determining, at the RS-DVR system, whether the plurality of memory storage devices can maintain real-time delivery of encoded media segments having the requested bitrate. When the RS-DVR system determines that one of the plurality of memory storage devices cannot maintain real-time delivery of encoded media segments having the requested bitrate, generating, at the RS-DVR system, a message intended for the subscriber system, wherein the message instructs the subscriber system to request a different bitrate for the media content file.

Also presented here is an embodiment of a method of operating an RS-DVR system that supports at least one subscriber system via data communication over a network. The method begins by receiving, at the RS-DVR system, a first set of encoded media segments that represent a media content file encoded at a first bitrate, and a second set of encoded media segments that represent the media content file encoded at a second bitrate. Each encoded media segment in the first set of encoded media segments corresponds to a respective partial period of playback time of the media content file, and each encoded media segment in the second set of encoded media segments corresponds to a respective partial period of playback time of the media content file. The method proceeds by receiving, at the RS-DVR system, an instruction to record the media content file on behalf of a subscriber. In response to receiving the instruction, the method stores the first set of encoded media segments and the second set of encoded media segments in a plurality of physically distinct memory storage devices in a distributed manner to prevent storage of any member of the first set of encoded media segments together with any member of the second set of encoded media segments that has an overlapping partial period of playback time of the media content file.

Another embodiment of an RS-DVR system is also provided here. The RS-DVR system includes a network interface to communicate data between the RS-DVR system and a subscriber system via a network, a file system module coupled to the network interface, an ingest agent coupled to the file system module to receive encoded media segments that represent a media content file encoded at a plurality of different bitrates, and a storage architecture coupled to the file system to store the encoded media segments as a single logical file.

Also presented here is a related embodiment of a method of operating an RS-DVR system that supports a subscriber system via data communication over a network. The method receives, at the RS-DVR system, encoded media segments that represent different versions of a media content file encoded at a plurality of different bitrates. The method also receives, at the RS-DVR system, an instruction to record the media content file on behalf of a subscriber. In response to receiving the instruction, the method stores the encoded media segments as a single logical file across a plurality of memory storage devices of the RS-DVR system.

Also provided is another method of operating an RS-DVR system that supports a subscriber system via data communication over a network. The method begins by receiving, at the RS-DVR system, encoded media segments that represent different versions of a media content file encoded at a plurality of different bitrates, along with an instruction to record the media content file on behalf of a subscriber. In response to receiving the instruction, the method stores the encoded media segments in a storage architecture as a single logical file, wherein the single logical file has a file structure arranged such that data representing encoded media segments for any particular bitrate is contiguous within the file structure.

The following disclosure also presents another method of operating an RS-DVR system that supports a plurality of subscriber systems via data communication over a network. The method receives a media content file at the RS-DVR system, and stores a plurality of recorded versions of the media content file in a storage architecture of the RS-DVR system without assigning any of the plurality of recorded versions of the media content file to any of the plurality of subscriber systems, resulting in a pool of unassigned recorded versions of the media content file. The method continues by maintaining the pool of unassigned recorded versions of the media content file until receiving at least one request for playback of the media content file.

Also provided is another embodiment of an RS-DVR system having a network interface to communicate data between the RS-DVR system and a plurality of subscriber systems via a network, a file system module coupled to the network interface, an ingest agent coupled to the file system module to receive a media content file, and a storage architecture coupled to the file system to store a plurality of recorded versions of the media content file without assigning any of the plurality of recorded versions of the media content file to any of the plurality of subscriber systems, resulting in a pool of unassigned recorded versions of the media content file. The file system module and the storage architecture cooperate to assign the unassigned recorded versions of the media content file to the plurality of subscriber systems in response to receiving requests for playback of the media content file.

Another embodiment of a method of operating an RS-DVR system that supports a plurality of subscriber systems via data communication over a network begins by receiving a media content file at the RS-DVR system. The method continues by estimating a number of playback requests for the media content file to be received from the plurality of subscriber systems, resulting in a predicted number. The method continues by storing recorded versions of the media content file in a storage architecture of the RS-DVR system without assigning any of the recorded versions of the media content file to any of the plurality of subscriber systems, resulting in a pool of unassigned recorded versions of the media content file, wherein the pool includes at least the predicted number of unassigned recorded versions of the media content file. The method continues by assigning, at the RS-DVR system, the unassigned recorded versions of the media content file to the plurality of subscriber systems upon receipt of requests for playback of the media content file.

Yet another embodiment of an RS-DVR system is also provided. The RS-DVR system includes a network interface to communicate data between the RS-DVR system and a plurality of subscriber systems via a network, a file system module coupled to the network interface, an ingest agent coupled to the file system module to receive encoded media segments that represent media content files encoded at a plurality of different bitrates, and a plurality of memory storage devices coupled to the file system to store the encoded media segments. Each of the plurality of memory storage devices is divided into a plurality of allocation units to store the encoded media segments, and each of the plurality of memory storage devices stores a respective index table comprising entries for at least some of the plurality of allocation units. Moreover, each of the entries includes descriptive data that characterizes one or more encoded media segments stored in the respective allocation unit.

Also provided is an embodiment of a method of operating an RS-DVR system that supports a plurality of subscriber systems via data communication over a network. The method begins by receiving, at the RS-DVR system, encoded media segments that represent media content files encoded at a plurality of different bitrates. The method stores the encoded media segments in a plurality of memory storage devices of the RS-DVR system, each of the plurality of memory storage devices being divided into a plurality of allocation units to store the encoded media segments. The method continues by maintaining, at each of the plurality of memory storage devices, a respective index table comprising entries for at least some of the plurality of allocation units. Each of the entries includes descriptive data that characterizes one or more encoded media segments stored in the respective allocation unit.

Also provided is another embodiment of a method of operating an RS-DVR system that supports a plurality of subscriber systems via data communication over a network. The method receives, at the RS-DVR system, encoded media segments that represent media content files encoded at a plurality of different bitrates, and stores the encoded media segments in a plurality of allocation units of a memory storage device. The method continues by generating an index table for the memory storage device, the index table including a respective entry for each of the plurality of allocation units having an encoded media segment stored therein. Each entry of the index table includes a content identifier that identifies a particular one of the media content files, a bitrate identifier that identifies one of the plurality of different bitrates, and a time index relative to the particular one of the media content files. The method continues by storing the index table in the memory storage device.

Also presented here is an embodiment of an RS-DVR system having a network interface to communicate data between the RS-DVR system and a subscriber system via a network, a file system module coupled to the network interface, an ingest agent coupled to the file system module to receive media content files, the media content files including shared rights media content files and per-subscriber rights media content files, a shared storage architecture coupled to the file system to store the shared rights media content files, and a per-subscriber storage architecture coupled to the file system to store the per-subscriber rights media content files.

Also presented here is an embodiment of a method of operating an RS-DVR system that supports a plurality of subscriber systems via data communication over a network. The method receives, at the RS-DVR system, shared rights media content files and per-subscriber rights media content files, and stores the shared rights media content files in a shared storage architecture of the RS-DVR system. The method continues by storing the per-subscriber rights media content files in a per-subscriber storage architecture of the RS-DVR system.

Also presented here is an embodiment of a method of operating an RS-DVR system that supports a subscriber system via data communication over a network. The method begins by receiving, at the RS-DVR system, media content files. The method continues by obtaining, at the RS-DVR system, an instruction to record a requested media content file, and by determining, at the RS-DVR system, whether the requested media content file has shared rights or per-subscriber rights. The method continues by storing the requested media content file in a shared storage architecture of the RS-DVR system when the determining step determines that the requested media content file has shared rights, and by storing the requested media content file in a per-subscriber storage architecture of the RS-DVR system when the determining step determines that the requested media content file has per-subscriber rights.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 12 is a diagram that depicts an exemplary embodiment of an index table that includes descriptive data related to media segments stored on a memory storage device;

FIG. 13 is a diagram that depicts an exemplary embodiment of an allocation unit having consistency check fields.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. Accordingly, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

Certain functions and operations of an RS-DVR system are described below with reference to figures that depict processes in the form of flow charts. In this regard, the various tasks performed in connection with a described process may be performed by software, hardware, firmware, or any combination thereof. In practice, portions of a described process may be performed by different elements of the described RS-DVR system. It should be appreciated that a described process may include any number of additional or alternative tasks, the tasks shown in a given figure need not be performed in the illustrated order, and that a described process may be incorporated into a more comprehensive procedure or process having additional functionality not described in detail herein. Moreover, one or more of the tasks shown in a flow chart figure could be omitted from an embodiment of the illustrated process as long as the intended overall functionality remains intact.

Figure 1:
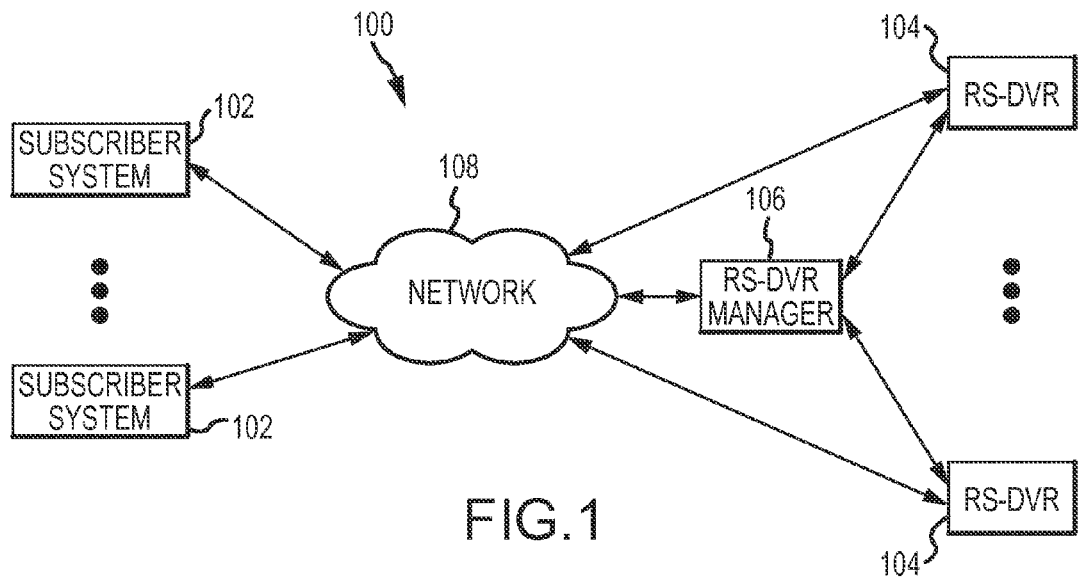
FIG. 1 is a schematic representation of an exemplary embodiment of a video services system.

FIG. 1 is a schematic representation of an exemplary embodiment of a video services system 100. The video services system 100 generally includes, without limitation: at least one subscriber system 102 and at least one RS-DVR system 104 that communicates with the subscriber systems 102. Although not always required, the illustrated embodiment of the system 100 includes an RS-DVR manager 106 to manage, control, or otherwise regulate the operation of the RS-DVR systems 104. Each RS-DVR system 104 is in data communication with one or more of the subscriber systems 102. In this regard, the system 100 may include or cooperate with a data communication network 108 that facilitates communication of media content from the RS-DVR systems 104 to the subscriber systems 102.

A subscriber system 102 may be realized in any number of different ways, and it may be suitably configured as needed to perform any number of desired functions, e.g., the presentation of media content, which may be audio content, video content, or audio-visual content. For example, a subscriber system 102 may be implemented as any of the following, without limitation: a computing device; a video game device; a telephone device (wireless or traditional); an electronic medical device; a household or other electronic appliance; a digital media player device; a digital media place-shifting device; a television set; a set top box for a video services receiver; stereo or other entertainment equipment; an alarm clock; or the like. These examples are not intended to limit or otherwise restrict the scope of the embodiments described herein.

The network 108 is any digital or other communications network capable of transmitting messages between the subscriber systems 102 and the RS-DVR manager 106 (or, for embodiments that lack the RS-DVR manager 106, between the subscriber systems 102 and the RS-DVR systems 104). In various embodiments, the network 108 includes any number of public or private data connections, links or networks supporting any number of communications protocols. The network 108 may include the Internet, for example, or any other network based upon IP or other data deliver protocols. In various embodiments, the network 108 also incorporates a wireless and/or wired telephone network, such as a cellular communications network for communicating with mobile phones, personal digital assistants, and/or the like. The network 108 also incorporate any sort of wireless or wired local area networks, such as one or more IEEE 802.3 and/or IEEE 802.11 networks.

The RS-DVR manager 106 may be implemented as a server that manages a designated group of RS-DVR systems 104. Although only one RS-DVR manager 106 is depicted in FIG. 1, an embodiment of the video services system 100 could include more than one RS-DVR manager 106 to handle any number of defined groups of RS-DVR systems 104. Each RS-DVR system 104 is configured to receive digital media content in a multiple bitrate format, record one or more versions of the media content on behalf of the subscriber systems 102, and initiate playback of stored media content at the request of the subscriber systems 102. Exemplary embodiments of the RS-DVR system 104, along with various operating features and functions, are described in detail below.

In accordance with one practical deployment, an RS-DVR system 104 provides centralized "cloud" or multiple system operator (MSO) hosted recording and playback of linear television channels. The RS-DVR system 104 can be designed to function like a traditional DVR, wherein each subscriber has a "personal" copy of recorded content, even though the copies are held on shared servers and shared storage media (e.g., hard disks).

With RS-DVR capabilities, a video services entity can provide a unified user experience in accessing live linear, start over, recorded and video-on-demand (VOD) video. The actual delivery path can vary by channel and by program depending on the granted content rights. For example, content with start over or time shifting or VOD rights from the publisher can use a single copy of the content in shared storage. For "DVR-like" playback of content without shared recording rights, RS-DVR servers are used. Continuous "Start Over" on multiple channels is a new and useful capability that in the past was not feasible to provide using a DVR approach, but which now is possible using RS-DVR systems 104. RS-DVR systems also allow the subscriber to record at the same time a virtually unlimited number of linear television channels and programs, whereas conventional DVRs typically only allow for one or two.

In certain embodiments, the video services system 100 handles adaptive rate (or multiple bitrate) digital media content. Accordingly, the RS-DVR systems 104 are preferably configured to support the multiple bitrate scheme by recording a plurality of encoded video bit rates. In certain implementations, each subscriber has only one copy of the recorded content because the various bit rate versions of the same content are stored together in one logical file. As with traditional adaptive rate approaches, the video is split up into multi-second "media segments" and retrieved as HTTP objects. In the context of this disclosure, a "media segment" may refer to a segment of audio content, a segment of video content, a segment of audio-visual content, or the like.

The adaptive rate RS-DVR system 104 can be implemented as a specialized web server that records and retrieves video files on behalf of any number of subscriber systems 102. The RS-DVR system 104 receives video from live stream encoders via either a multicast of the encoded media segments or via an HTTP GET request methodology. The RS-DVR system 104 then immediately makes as many copies of the video as there are subscribers requesting to record the channel. Each subscriber has, in effect, their own area that contains their individual copies of the channel. Each subscriber can have different programs recorded on different RS-DVR systems 104—each individual recording is on only one server. On playback, the subscriber system 102 requests video from the appropriate RS-DVR system 104 and specifies which individual subscriber is requesting it (so that the RS-DVR system 104 can find the correct video copy). The video is returned to the requesting subscriber system 102 from the specialized web server. The HTTP video objects are marked as being non-cacheable to ensure that the personalized video copy is only delivered to the requesting subscriber system.

In accordance with certain exemplary embodiments, as soon as the video is encoded and sent to the RS-DVR system 104, it is immediately separated into per subscriber copies by being written multiple times into separate files in the file system. From then on the video remains separate and is only accessible by the individual subscriber that requested the recording. In that way the RS-DVR video storage and delivery scheme does not run afoul of copyright law. In other embodiments, where copyright law is not of the same concern, the RS-DVR system 104 may instead utilize one copy of a particular video for multiple users. For example, one copy may be used for all users or multiple copies may distributed across multiple storage devices or servers that serve some subset of users.

As mentioned above, the RS-DVR manager 106 can be utilized to support a "cluster group" of RS-DVR systems 104. In practice, there can be multiple cluster groups with each having one or more RS-DVR systems 104. Depending on the particular system requirements, a cluster group may include up to hundreds of RS-DVR systems 104. A cluster group is used to provide scalability and creates certain types of failure resiliency.

Each cluster group may be configured to record a set of channels. At the time the subscriber is provisioned with their channel lineup, each subscriber is assigned to a cluster group for each channel that can be recorded on their behalf. The RS-DVR systems 104 within a cluster group are physically located together. They typically can be deployed within the broadband access network close to the subscribers and close to where Content Delivery Network (CDN) edge HTTP caching servers are located.

The RS-DVR manager 106 may be implemented as one or more servers that monitor the status and capacity of each RS-DVR system 104 and cluster group. The RS-DVR manager 106 assigns a specific RS-DVR system 104 within the cluster group to record a specific channel and/or program as per subscriber requests. Any RS-DVR system 104 within the cluster group is capable of recording any content for any subscriber assigned to the cluster group. The RS-DVR manager 106 makes the actual recording assignments a function of available capacity and current (and future scheduled) loads on the individual RS-DVR systems 104.

As described in more detail below, an embodiment of the RS-DVR system 104 spreads each recorded video asset across the multiple drives within each chassis/enclosure. This allows for load balancing and maximum scalability. This also facilities quick recovery of video in the case of soft or catastrophic server failures. The RS-DVR system 104 allocates what video is recorded where as a function of the individual drive performance characteristics. It also writes data to the disk drives in a way that minimizes head throw. This improves the mean time between failure for the disk drives, yet allows for the drives to be continually driven hard. This also allows the RS-DVR systems 104 to use less expensive disk drives.

The RS-DVR systems 104 are designed to operate continually at full capacity and performance for long periods of time. The RS-DVR systems 104 can sustain multiple hard disk failures without causing the subscriber to lose access to their recorded video. The RS-DVR systems 104 need not implement traditional RAID architectures, but instead take advantage of the inherent failure resiliency that comes from adaptive rate and multiple bitrate versions of content. Moreover, failed hard disk drives can be "hot swapped" at any time and replaced with different or new drives. Unlike traditional RAID, upon replacement there is no rebuild time. As faster/better drives are added, the RS-DVR system 104 will automatically take advantage of the better capabilities, again in contrast to traditional RAID which typically do not.

A practical implementation of the RS-DVR system 104 must contemplate hard disk failures. Unlike traditional DVR systems, where a failed hard disk typically results in lost content, failure of a hard disk of the RS-DVR system 104 does not result in a complete loss. Although lost video data is not recovered, there will almost always be a different bitrate version available on a different disk. Thus, a drive failure only affects a small portion of a given video recording, preferably only a single bitrate of each affected portion. In response to a failed disk drive, the RS-DVR system 104 signals to the subscriber system 102 to switch to a different bitrate (which will be on a different drive). Multiple hard disk failures will affect more data, but with a given recording spread across dozens of drives the impact of even multiple failures is minimal. When a failed drive is "hot swapped" with a new drive the RS-DVR system 104 instantaneously detects that a new drive is available and immediately starts to use it to record video.

SATA drives in particular can, over time, lose some of their original performance and speed. The RS-DVR system 104 can detect this phenomena and start assigning less and less video to a slowing drive. This can be monitored and at a certain point the RS-DVR system 104 can automatically quit writing new video to the drive, which over time will depopulate it and allow for replacement. SATA drives may also intermittently (and temporarily) become very slow. This could affect playback, when several subscribers need video from a particular slowed drive. The RS-DVR system 104 under this case will signal the subscriber system 102 to try a different bit rate, which results in playback from a different drive.

If an RS-DVR system 104 goes down, upon detecting failure, the RS-DVR manager 106 immediately assigns active recordings assigned to the failed RS-DVR system 104 to different RS-DVRs within the cluster group. If an RS-DVR system 104 has a hard failure, the system is designed to allow the hard disks to be immediately connected to a different RS-DVR system 104. This could be a standby server or perhaps an operational one that is ready to receive hard disks. In accordance with certain embodiments, individual asset recordings are not allowed to span multiple disk enclosures. Accordingly, upon re-mount the new RS-DVR system 104 will restore the content on the disk drives and make the content immediately available, subject to the limitations previously explained.

It may be useful to locate primary and standby RS-DVR managers 106 in different geographic locations, as well as different cluster groups. That way, if a site goes down then the service can at least partially remain alive. As soon as network connectivity is restored, the dual RS-DVR managers 106 will see each other and elect one to return to standby mode. The new singular RS-DVR manager 106 will undo any damage or redundant recordings that the other RS-DVR manager 106 did. With it likely that extra recordings were scheduled, the damage will be minimal or non-existent and the recovery will be very straight forward and typically not perceivable by the subscriber.

In accordance with one implementation, the RS-DVR systems 104 are deployed by MSOs close to the edge of their network, at roughly the same location where HTTP caching is provided. The RS-DVR systems 104 would be deployed at that location because the content delivered by the RS-DVR systems 104 is required to be "non-cacheable" and video delivery typically works better if the content comes from a system that is "close" to the subscriber.

An important consideration in planning on where to deploy RS-DVR cluster groups is the cost of the back haul bandwidth. Every channel being recorded by the cluster group requires back haul bandwidth for all of the bitrates, which suggests that the RS-DVR cluster groups should be centralized. However, with the streams being delivered to the subscriber from the RS-DVR systems 104 being marked as non-cacheable, depending on how many subscribers there are at peak load times it could be better to locate the RS-DVR cluster groups closer to the subscriber, to avoid using back haul bandwidth for subscriber playback. It is therefore recommended that the RS-DVR systems 104 be deployed both centrally and at the edge with the centralized RS-DVR systems 104 being utilized for content where the amount of bandwidth required for actual playback will be less than the bandwidth required to send the multiple copies down to the edge RS-DVR systems 104. The RS-DVR manager 106 will use actual playback analytics in deciding where to assign particular recordings.

Figure 2:
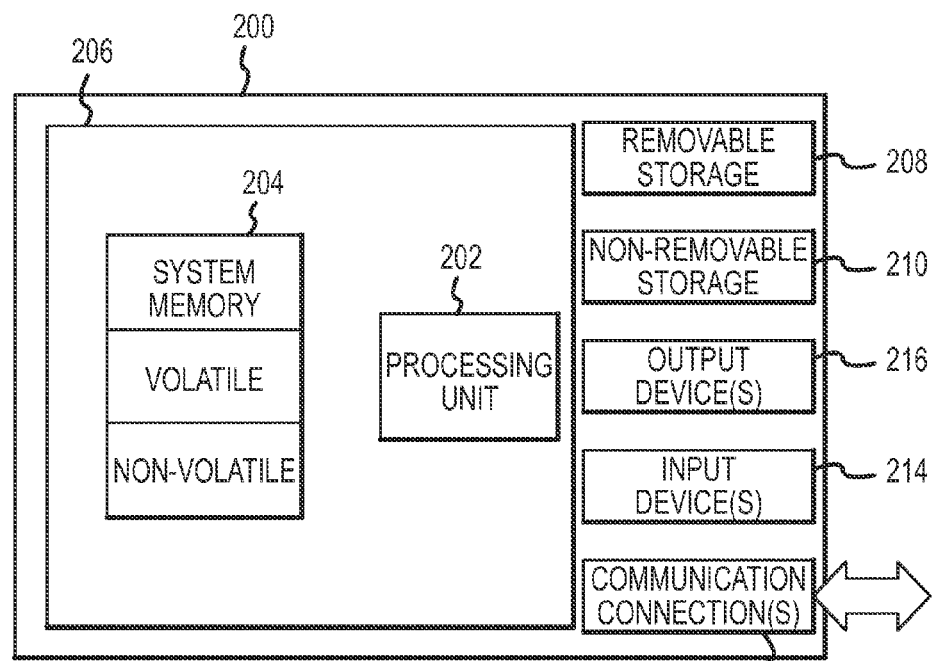
FIG. 2 is a simplified schematic representation of an exemplary computer-based implementation of an embodiment of an RS-DVR system.

Referring again to the drawings, FIG. 2 is a simplified schematic representation of an exemplary computer-based implementation of an embodiment of an RS-DVR system 200. The RS-DVR system 200 is only one example of a suitable implementation and is not intended to suggest any limitation as to the scope of use or functionality of the RS-DVR systems 104. For example, although the RS-DVR system 200 is depicted as a unitary component, a practical implementation may include a plurality of physical hardware components that cooperate in a distributed architecture.

The RS-DVR system 200 and certain aspects thereof may be described in the general context of computer-executable instructions, such as program modules, executed by one or more processors or other devices. Generally, program modules include routines, programs, objects, components, data structures, and/or other elements that perform particular tasks or implement particular abstract data types. Typically, the functionality of the program modules may be combined or distributed as desired in various embodiments.

The RS-DVR system 200 typically includes at least some form of computer readable media. Computer readable media can be any available media that can be accessed by the RS-DVR system 200 and/or by applications executed by the RS-DVR system 200. By way of example, and not limitation, computer readable media may comprise computer storage media that includes volatile, nonvolatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the RS-DVR system 200.

Referring again to FIG. 2, in its most basic configuration, the RS-DVR system 200 typically includes at least one processing unit 202 and a suitable amount of memory 204. This most basic configuration is identified in FIG. 2 by reference number 206. The processing unit 202 and the memory 204 cooperate to provide the desired functionality, processing logic, and operating intelligence for the RS-DVR system 200, as described in more detail below. Depending on the exact configuration and type of RS-DVR system 200, the memory 204 may be volatile (such as RAM), non-volatile (such as ROM, flash memory, etc.) or some combination of the two. The RS-DVR system 200 may also include additional storage (removable and/or non-removable) including, but not limited to, magnetic or optical disks or tape. Such additional storage is illustrated in FIG. 2 by removable storage 208 and non-removable storage 210. The memory 204, the removable storage 208, and the non-removable storage 210 are all examples of computer storage media as defined above.

The RS-DVR system 200 may also contain communications connection(s) 212 that allow the system 200 to communicate with other devices, such as the RS-DVR manager 106 or the subscriber systems 102 shown in FIG. 1. The RS-DVR system 200 may also include or communicate with input device(s) 214 such as a keyboard, mouse or other pointing device, pen, voice input device, touch input device, etc. The RS-DVR system 200 may also include or communicate with output device(s) 216 such as a display, speakers, indicator lights, a printer, or the like.

Figure 3:
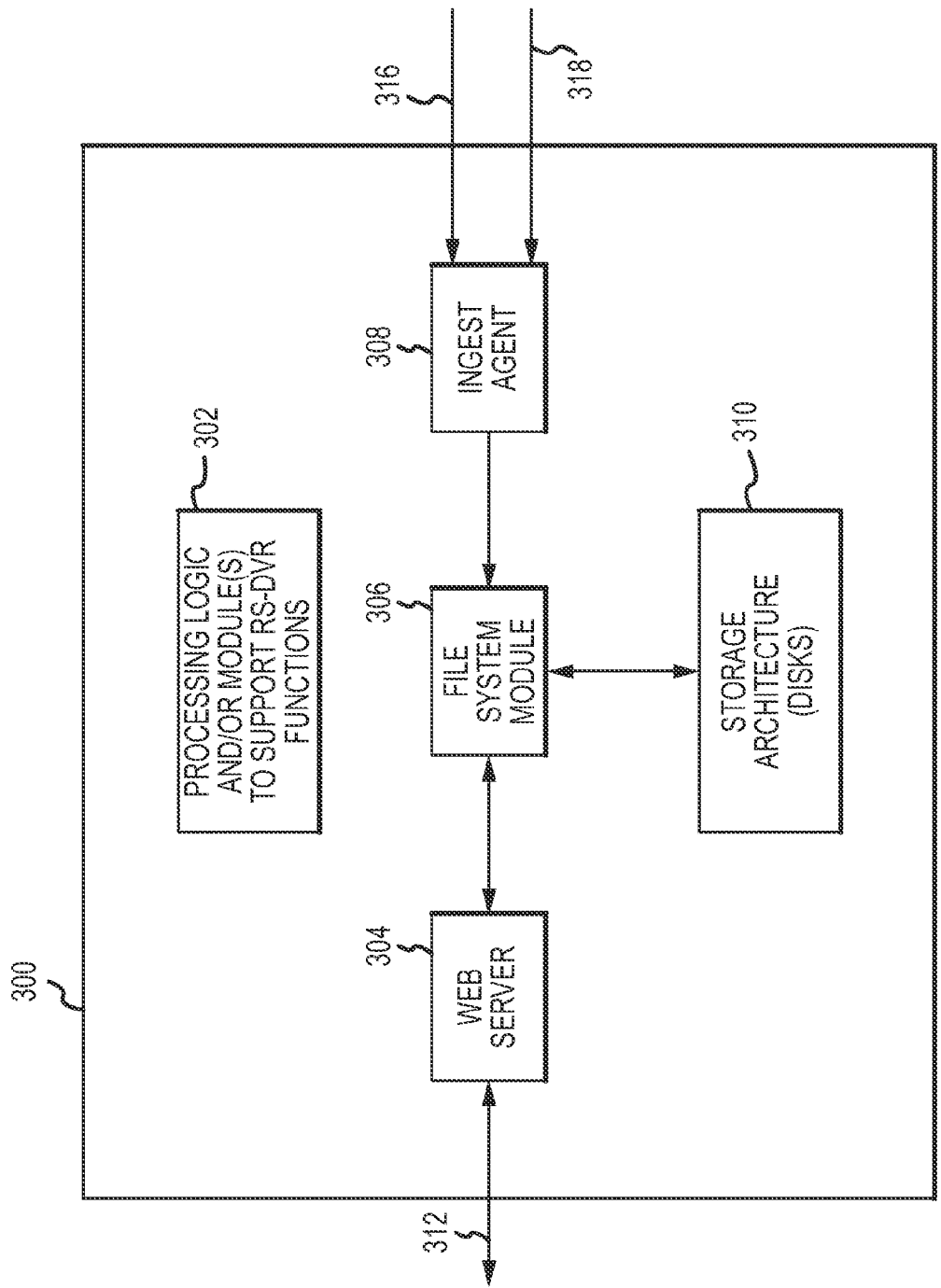
FIG. 3 is a schematic representation of an exemplary embodiment of an RS-DVR system.

FIG. 3 is another schematic representation of an exemplary embodiment of an RS-DVR system 300. FIG. 3 depicts some of the primary logical or functional modules of the RS-DVR system 300. The illustrated embodiment of the RS-DVR system 300 generally includes, without limitation: a processing logic module 302; a network interface (which in this exemplary embodiment is realized as a web server 304); a file system module 306; an ingest agent 308; and a storage architecture 310 (which in this exemplary embodiment is realized as a plurality of memory storage devices such as hard disk drives). These elements cooperate to support the various functions and operations of the RS-DVR system 300.

The processing logic module 302 may cooperate with the web server 304, the file system module 306, the ingest agent 308, and the storage architecture 310 as needed during operation of the RS-DVR system 300. Moreover, the processing logic module 302 may be suitably configured to support one or more designated functions of the RS-DVR system 300. In this regard, the processing logic module 302 may include any desired functionality. For example, the processing logic module 302 may be designed to include a content rights management module, a hard disk monitor module, a diagnostic module, or the like.

The web server 304 (and/or any suitable network interface) represents hardware, software, firmware, and/or logic that is configured to communicate data between the RS-DVR system 300 and another component or element such as a subscriber system. Referring to FIG. 1, the web server 304 can be used to deliver media content to the subscriber systems 102 via the network 108. The arrow 312 in FIG. 3 represents the data communication link between the web server 304 and the network 108. In certain embodiments, the web server 304 cooperates with the file system module 306 to provide media content files (in the form of encoded media segments) to the subscriber systems 102 in accordance with established HTTP techniques and methodologies.

The file system module 306 is utilized to manage, organize, and maintain files in the storage architecture 310. As explained in more detail below, the file system module 306 can be written to accommodate multiple bitrate encoded media segments that are stored in a distributed manner across a plurality of hard disks of the storage architecture 310. The file system module 306 also cooperates with the ingest agent 308 to accommodate the recording and storage of encoded media segments as needed during the operation of the RS-DVR system 300. The ingest agent 308 may be coupled to the file system module 306 to receive encoded media segments that represent media content files encoded at a plurality of different bitrates. The ingest agent 308 is capable of receiving multicast delivered media segments 316 and/or unicast delivered media segments 318 from an appropriate content source.

One suitable type of content source that provides multiple bitrate encoded media segments is described in U.S. Pat. No. 7,818,444, the content of which is incorporated by reference herein.

The storage architecture 310 is coupled to the file system module 306 to store encoded media segments that can be subsequently accessed for playback to one or more subscriber systems. In certain implementations, the storage architecture 310 includes a plurality of memory storage devices such as hard disk drives. The memory storage devices are physically distinct and separate units that can be removed and replaced as needed. The file system module 306 governs the manner in which the encoded media segments are stored in the different memory storage devices, as explained in more detail below.

During operation, the processing logic module 302, web server 304, file system module 306, ingest agent 308, and storage architecture 310 cooperate to carry out content recording, content file (media segment) storing, file management, disk management, content playback, and other functions of the RS-DVR system 300. For the multiple bitrate implementation described here, these elements of the RS-DVR system 300 cooperate to provide stored media segments to the subscriber systems 102 for presentation using at least one of the plurality of different available bitrates.

Multiple Bitrate Media Segments

Figure 4:
FIG. 4 is a schematic representation of a media content file.

FIG. 4 a is a schematic representation of an exemplary media content file 400, which may correspond to an audio or video program, clip, segment, movie, or the like. The content file 400 may be distributed by a publisher or source for purposes of broadcast or unicast distribution via a video services system. The actual subject matter of the content file 400 (although unimportant for purposes of this description) may comprise a television broadcast, sports event, movie, music, concert, etc. The content file 400 may be live or archived content. The content file 400 may comprise uncompressed video and audio, or alternatively, video or audio. Alternatively, the content file 400 may be compressed using standard or proprietary encoding schemes.

Figure 5:
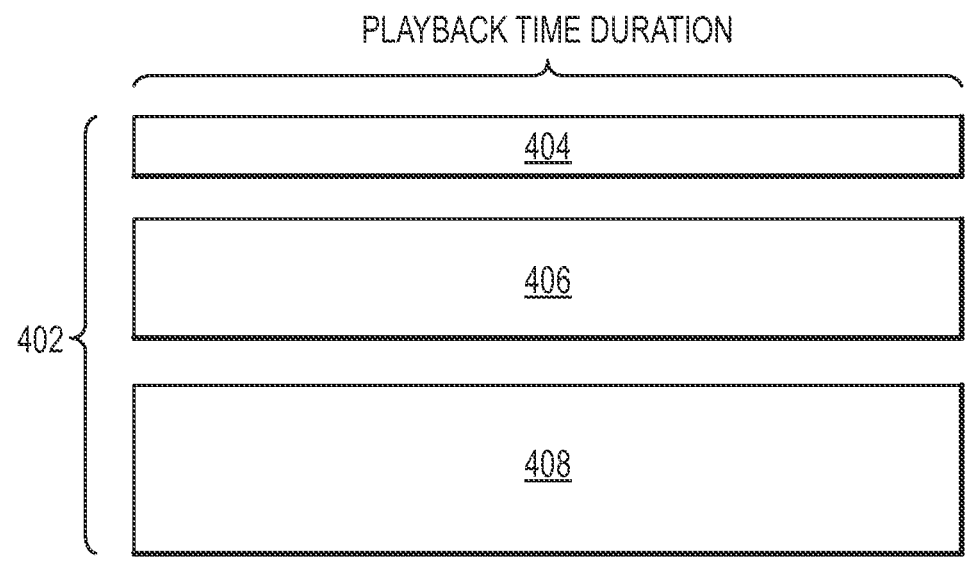
FIG. 5 is a schematic representation of media content streams.

FIG. 5 is a schematic representation of a plurality of streams 402 having varying degrees of quality and bandwidth. In one embodiment, the plurality of streams 402 comprises a low quality stream 404, a medium quality stream 406, and a high quality stream 408. Each of the streams 404, 406, 408 represents a copy or a version of the content file 400 (see FIG. 4) encoded and compressed to varying bitrates. For example, the low quality stream 404 may be encoded and compressed to a bitrate of 100 kilobits per second (kbps), the medium quality stream 406 may be encoded and compressed to a bitrate of 200 kbps, and the high quality stream 408 may be encoded and compressed to 600 kbps.

Figure 6:
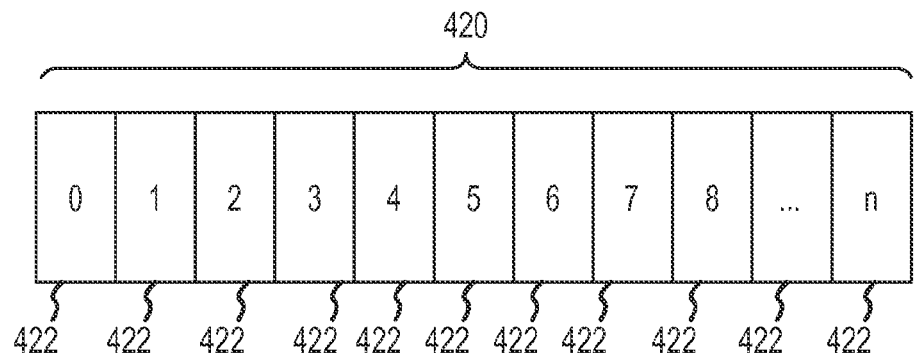
FIG. 6 is a schematic representation of a media content stream divided into a plurality of media segments.

FIG. 6 is a schematic representation of a media content stream 420 divided into a plurality of source media segments 422. As used herein, "media segment" refers to any sized portion of the content file 400. Each media segment 422 may comprise a portion of the content contained in the stream 420, encapsulated as an independent media object. The content in a media segment 422 may have a unique time index in relation to the beginning of the content contained in the stream 420. In one embodiment, the content contained in each media segment 422 may have a duration of two seconds. For example, media segment 0 may have a time index of 00:00 representing the beginning of content playback, and media segment 1 may have a time index of 00:02, and so on. Alternatively, the time duration of the media segments 422 may be any duration that is less than the entire playback duration of the content in the stream 420. In a further embodiment, the media segments 422 may be divided according to file size instead of a time index and duration.

Figure 7:
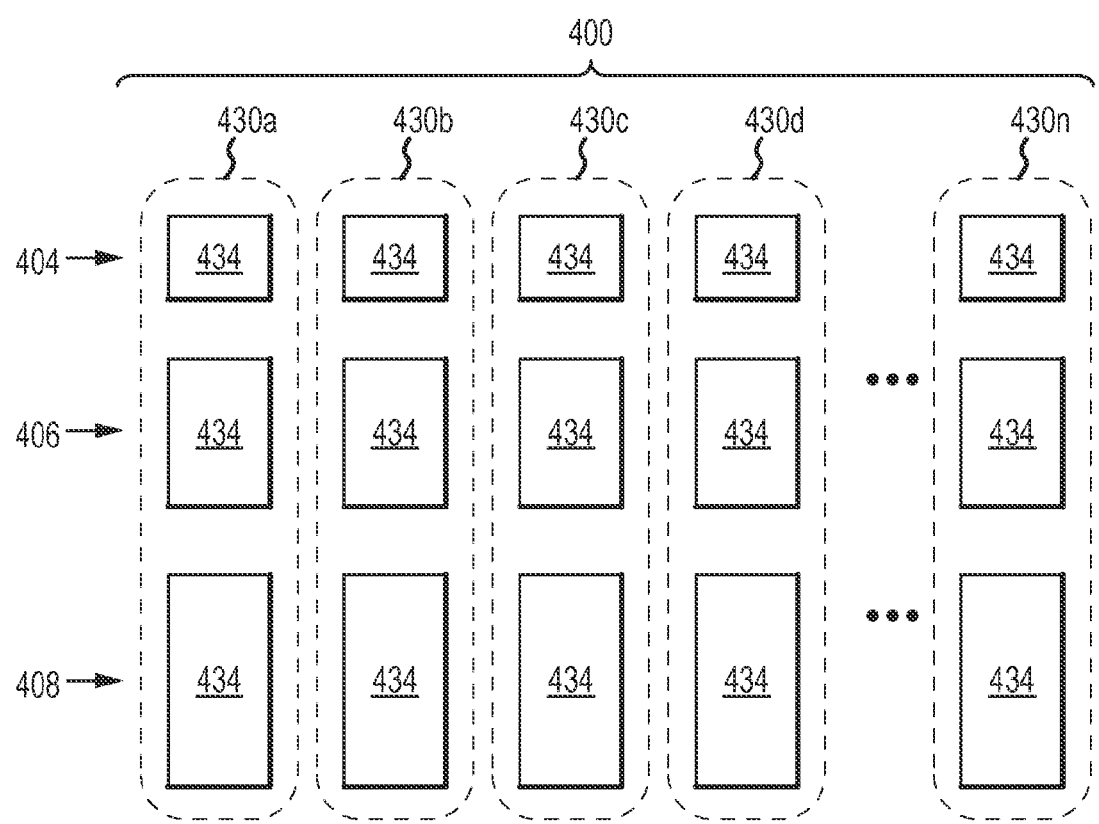
FIG. 7 is a schematic representation of encoded media segments corresponding to a media content file.

FIG. 7 is a schematic representation of encoded media segments corresponding to the media content file 400. FIG. 7 depicts different sets 430 of media segments, where a "set" refers to a group of media segments having identical time indices and durations but varying bitrates. In the depicted embodiment, the set 430a encompasses all media segments having a time index of 00:00. The set 430a includes encoded media segments 434 having low, medium, and high bitrates (identified by reference numbers 404, 406, 408). Of course, each set 430 may include more than the depicted three bitrates which are given by way of example only. One skilled in the art will recognize that any number of streams having different bitrates may be generated from the original content file 400.

As described above, the duration of one media segment 434 may be approximately two seconds. Likewise, each set 430 may comprise a plurality of media segments 434 where each media segment 434 has a playable duration of two seconds. Alternatively, the duration of a media segment 434 may be predetermined or dynamically variable depending upon a variety of factors including, but not limited to, network congestion, system specifications, playback resolution and quality, etc. In the depicted embodiment, the content file 400 may be collectively formed of the plurality of sets 430. The number of sets 430 may depend on the length of the content file 400 and the length or duration of each media segment 434.

Referring again to FIG. 3, the ingest agent 308 receives media content files in the form of a plurality of encoded media segments that correspond to a plurality of different bitrates. In other words, for each media content file to be recorded by the RS-DVR system 300, the ingest agent 308 receives the various encoded media segments associated with the different time indices and the different bitrates.

Basic RS-DVR Operation

Figure 8:
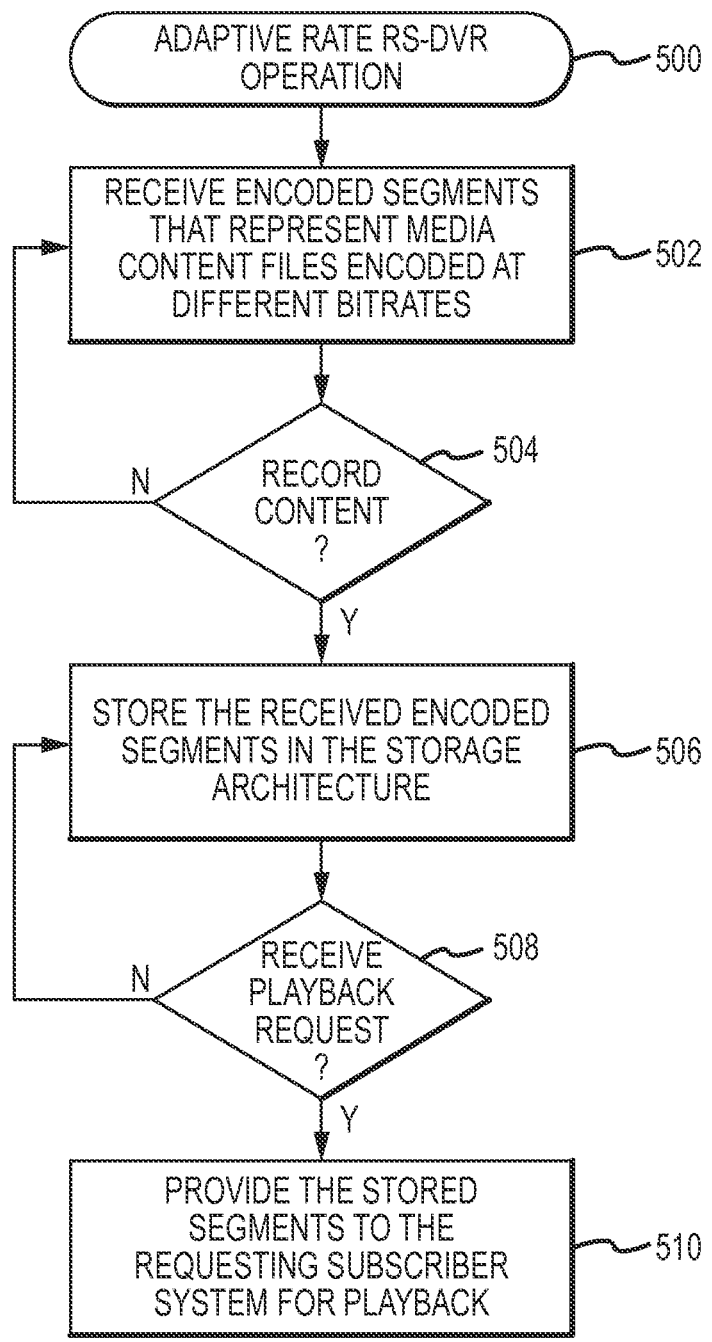
FIG. 8 is a flow chart that illustrates an exemplary embodiment of a process for operating an adaptive rate RS-DVR system.

Referring now to FIG. 8, an exemplary embodiment of a process 500 for operating an adaptive rate RS-DVR system will be described. As described previously, the RS-DVR system supports one or more subscriber systems via data communication over a network such as the Internet. The RS-DVR system receives encoded media segments that represent one or more media content files encoded at a plurality of different bitrates (task 502). In certain implementations, each media content file is encoded at ten different bitrates, and each media segment represents a two-second segment of the media content file, as explained above. However, it is to be appreciated that any number of encoded bit rates may be utilized depending on desired design criteria, such as available bandwidth, supported devices and the like. Accordingly, the encoded media segments received by the RS-DVR system preferably include different sets of encoded media segments corresponding to the different bitrates.

If any given media content file is to be recorded (query task 504), then the RS-DVR system stores the encoded media segments for that particular media content file in the storage architecture of the RS-DVR system (task 506). A given media content file could be stored any number of times if so desired. For example, it may be desirable or required to store a first instantiation of the encoded media segments on behalf of a first subscriber, a second instantiation of the encoded media segments on behalf of a second subscriber, and so on. Alternatively (or additionally), it may be desirable or allowable to store a shared instantiation of the encoded media segments on behalf of a plurality of different subscribers.

In certain embodiments, media content files are recorded and stored at the request of a subscriber or a subscriber system. Thus, query task 504 may determine whether the RS-DVR system receives an instruction to record the media content file on behalf of a subscriber. For example, a recording instruction or request may be received at the RS-DVR system in the form of an HTTP request from one of the subscriber systems. Alternatively, some or all media content files could be automatically recorded by the RS-DVR system in a manner that does not require any instructions, commands, or requests from the subscriber systems. In this regard, the RS-DVR system could be configured to record all available content at all of the different bitrates to provide instant start-over functionality for the end users. In other words, the RS-DVR system could record and store multiple bitrate media segments corresponding to all programming available from a video services provider and for all users/subscribers of the video services provider. Although storage space may represent a practical limitation of this "catch-all" approach, if only a limited period of time is recorded (e.g., the last three or four hours), then the approach is viable and realistic.

In certain embodiments, the storage architecture is realized as a plurality of distinct and separate memory storage devices (e.g., hard disk drives). The use of multiple storage devices allows the RS-DVR system to store the media segments for any given media content file in a distributed manner across the plurality of memory storage devices. Thus, if one of the storage devices fails or is otherwise unable to support satisfactory delivery of its stored media segments, the entire media content file is not lost. Moreover, the use of multiple storage devices allows the RS-DVR system to distribute the stored media segments for different subscriber systems. For instance, task 506 may be controlled or managed such that each of the plurality of different memory storage devices maintains stored media segments for a plurality of different subscriber systems. Alternatively, an embodiment of the RS-DVR system could assign memory storage devices on a per-subscriber basis.

The RS-DVR system can maintain stored media segments for any amount of time. The illustrated embodiment of the process 500 checks whether a request for playback of a stored media content file is received at the RS-DVR system (query task 508). In response to receiving a playback request, the RS-DVR system provides stored media segments to the requesting subscriber system (via the network) for presentation or playback at the requesting subscriber system (task 510). Thus, the encoded media segments provided to the requesting subscriber system correspond to the requested media content file encoded at a requested bitrate. For the exemplary embodiment described here, a playback request includes or takes the form of an HTTP GET request that originates at the requesting subscriber system and is received at the web server of the RS-DVR system. In practice, each HTTP GET request may include or otherwise indicate the particular media content file to be played back, a user identifier that identifies the requesting subscriber system and/or the requesting user, a requested bitrate for the media content file, a time index or time range associated with one or more media segments, and any other information that might be needed to enable the RS-DVR system to locate and access the appropriate stored media segments.

Unavailable Bitrate Signaling

As mentioned above with reference to the RS-DVR operating process 500, a subscriber system can request playback of a media content file at a designated bitrate. In certain situations, it may not be possible for the RS-DVR system to provide some or all of the encoded media segments at the requested bitrate. This might occur, for example, if a memory storage device has failed, is too overloaded, or has experienced a slowdown in its operating speed. If the bitrate for one or more requested media segments is not available, then the RS-DVR system can take appropriate action to ensure that the subscriber does not experience an interruption in service.

Figure 9:
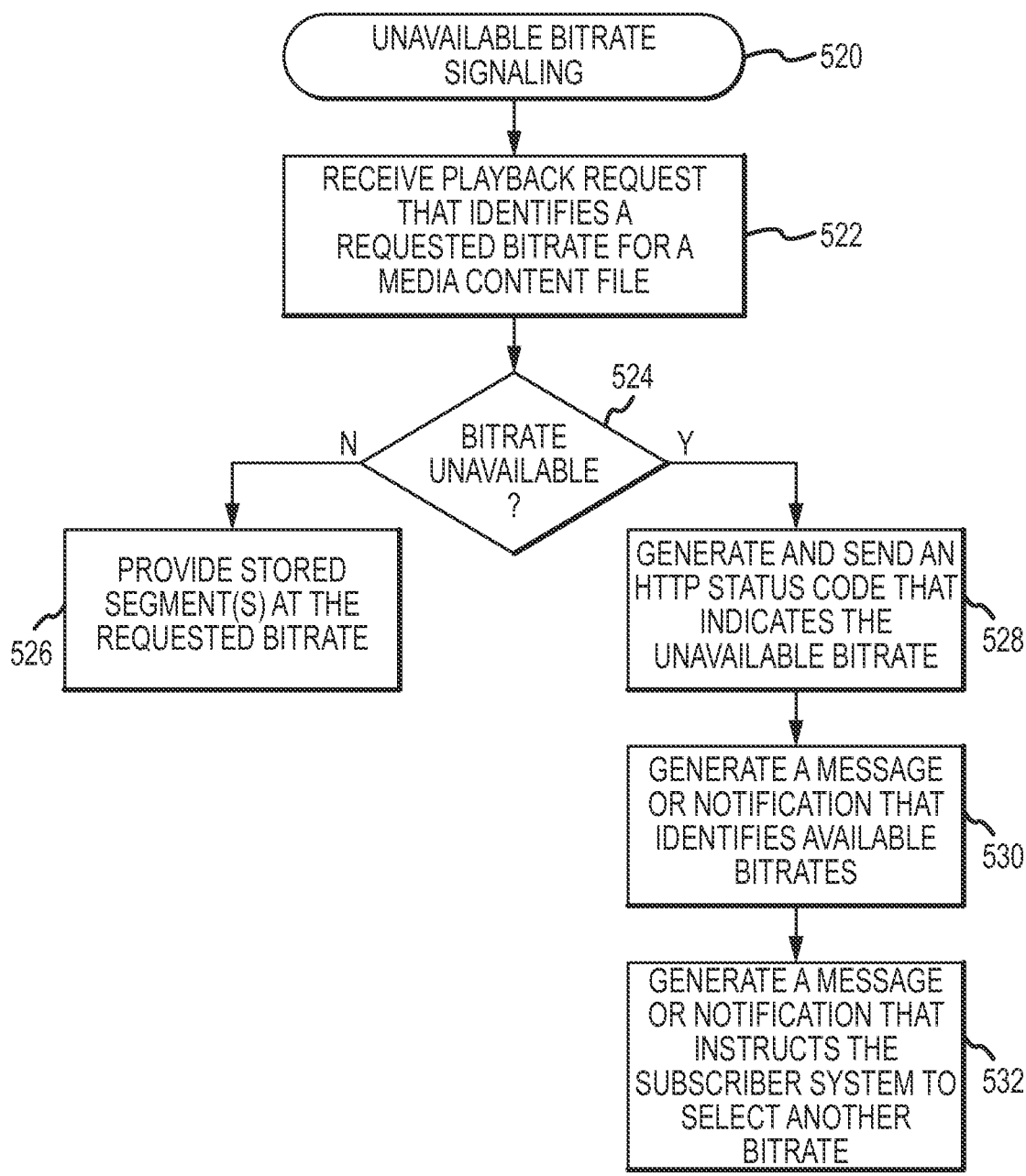
FIG. 9 is a flow chart that illustrates an exemplary embodiment of an unavailable bitrate signaling process.

FIG. 9 is a flow chart that illustrates an exemplary embodiment of an unavailable bitrate signaling process 520, which may be performed by an RS-DVR system of the type described herein. The process 520 receives a playback request that identifies a requested bitrate for a given media content file (task 522). If the requested bitrate is available (the "NO" branch of query task 524), then the RS-DVR system provides the stored media segment(s) at the requested bitrate (task 526) and continues to receive additional playback requests as usual.

If query task 524 determines that the requested bitrate is unavailable, then the RS-DVR system may generate and send one or more messages, notifications, codes, or the like. For example, in certain embodiments the web server of the RS-DVR system generates and sends an HTTP status code to indicate that the requested bitrate for the requested media content file is unavailable at the RS-DVR system (task 528). Depending upon the particular implementation, the RS-DVR system could use a standard HTTP code (such as HTTP status code 204) to indicate the unavailable bitrate, or it could use a custom or system-specific status code to indicate the unavailable bitrate. As an alternative to task 528 (or in addition to task 528), the RS-DVR system could generate and send a message that identifies or lists any available bitrates for the requested media content file (task 530). This approach could result in less "trial and error" on the part of the subscriber system, especially if more than one bitrate is unavailable at the RS-DVR system. As another alternative to task 528 (or in addition to task 528), the RS-DVR system could generate and send a message that instructs the subscriber system to select and request another bitrate (task 532). In other words, the RS-DVR system prompts the requesting subscriber system to choose a bitrate that is different than the previously requested bitrate.

The approaches described above assume that the video services system prefers to have the subscriber system specify and request the desired bitrate. In certain embodiments, however, the RS-DVR system could automatically select a different bitrate and provide the corresponding media segments to the subscriber system when the requested bitrate is unavailable. In other words, the dynamic switching of bitrates may be performed in a way that is transparent to the subscriber system. Such automatic selection of a different bitrate could be performed in conjunction with any of the signaling techniques mentioned above. For example, the RS-DVR system could provide media segments at a non-requested bitrate to ensure seamless content delivery while concurrently informing the requesting subscriber system of the new bitrate and/or while concurrently asking the requesting subscriber system to select a different bitrate going forward.

Shared and Per-Subscriber Storage of Media Content Files

A traditional DVR system that is owned or leased by a subscriber for personal operation will record individual copies of media content for the personal and exclusive use by that particular subscriber. As an extension of this concept, an RS-DVR system of the type described here is capable of recording and storing encoded media segments for media content files such that each subscriber has its own storage space maintained by the RS-DVR system. Consequently, any given media content file would be redundantly recorded by the RS-DVR system to provide an individually assigned copy of that media content file to each subscriber system. In certain situations, however, the RS-DVR system may be permitted to share a single instantiation of a stored media content file with a plurality of different subscribers. For example, some content producers or content publishers may grant shared access rights or public distribution rights to their media content; such media content need not be redundantly stored to support multiple subscribers. For this reason, it would be desirable to have a single RS-DVR system that functions in a hybrid manner to support both shared and per-subscriber copies of media content files.

Referring again to FIG. 3, the ingest agent 308 of the RS-DVR system 300 may be suitably configured to receive media content files having shared access rights associated therewith (i.e., "shared rights media content files") and/or media content files having per-subscriber access rights associated therewith (i.e., "per-subscriber rights media content files"). In this regard, the processing logic module 302 may include or cooperate with a content rights management module (not separately shown in FIG. 3) to determine whether a received media content file has shared rights or per-subscriber rights associated therewith, and/or to determine whether a subscriber system (or, equivalently, a subscriber) has shared rights or per-subscriber rights to access a stored media content file.

The storage architecture 310 of the RS-DVR system 300 may include a shared storage architecture to store shared rights media content files, and a per-subscriber storage architecture to store per-subscriber rights media content files. In certain implementations, the shared storage architecture exclusively stores shared rights media content files without storing any per-subscriber rights media content files, and the per-subscriber storage architecture exclusively stores per-subscriber rights media content files without storing any shared rights media content files. Moreover, the shared storage architecture and the per-subscriber architecture are preferably realized as physically distinct and separated hardware devices, e.g., two separate hard disk drives, two separate disk drive enclosures, or the like. Notably, the use of two types of storage enables a single instantiation of the RS-DVR system 300 to handle the storage of different content types and to contemplate use with shared rights content only, per-subscriber rights content only, or a hybrid of both.

Figure 10:
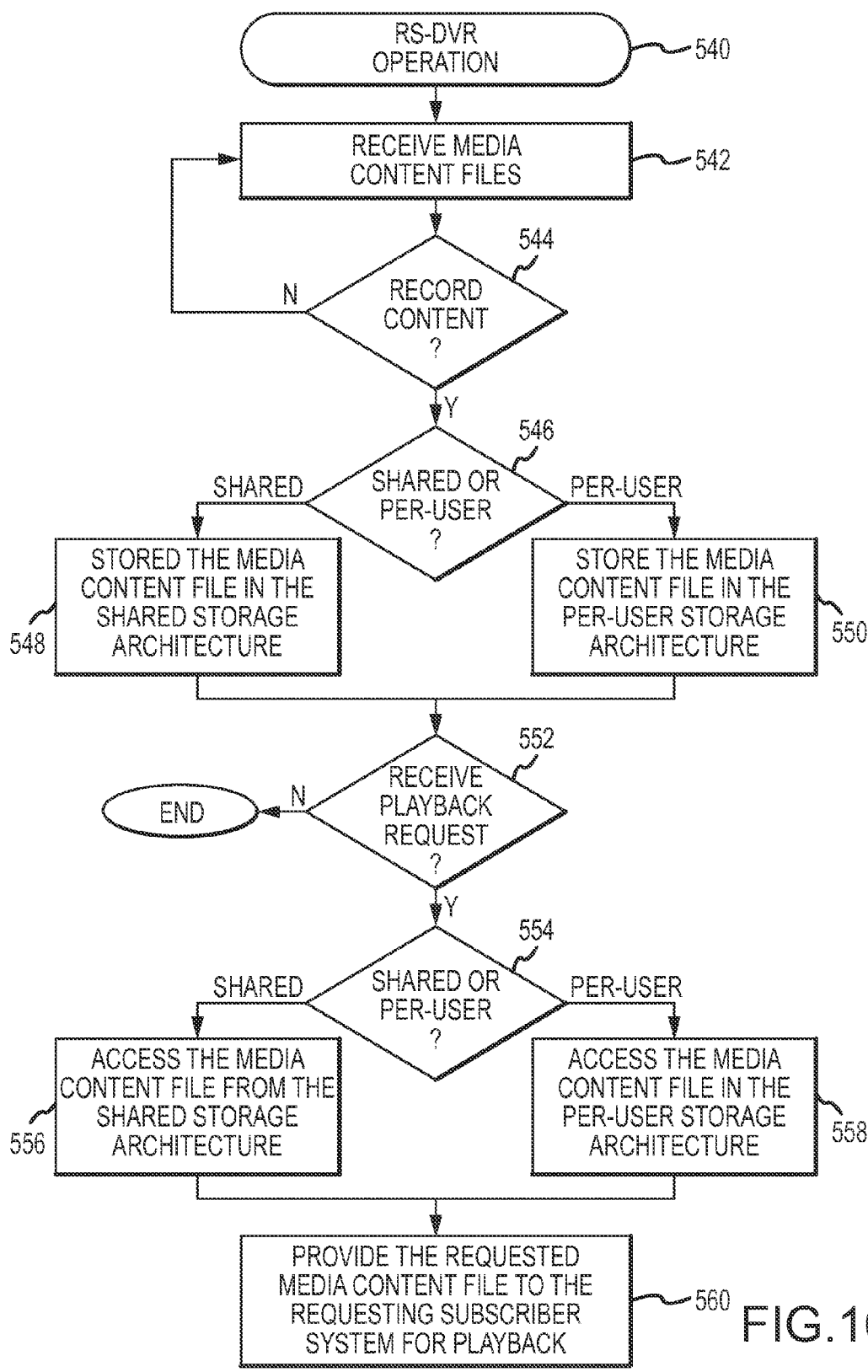
FIG. 10 is a flow chart that illustrates an exemplary embodiment of a process for operating an RS-DVR system.

FIG. 10 is a flow chart that illustrates an exemplary embodiment of a process 540 for operating an RS-DVR system that supports at least two storage architectures for maintaining shared content and per-subscriber content. The RS-DVR system receives media content files (task 542); the media content files may be in the form of encoded media segments corresponding to different bitrates, as described above. If any given media content file is to be recorded (query task 544), then the RS-DVR system determines whether the media content file has shared rights or per-subscriber rights associated therewith (query task 546). As mentioned above with reference to the process 500 depicted in FIG. 8, the recording of media content files may be initiated by a subscriber system by sending a suitably formatted instruction to the RS-DVR system. Alternatively, recording may be automatically initiated at the RS-DVR system.

If the RS-DVR system determines that the media content file has shared rights, then the media content file is stored in the shared storage architecture of the RS-DVR system (task 548). If, however, the media content file does not have shared subscriber rights, then the media content file is stored in the per-subscriber storage architecture (task 550). In certain embodiments, the shared and per-subscriber storage architectures are managed and controlled in an ongoing manner such that the shared storage architecture exclusively stores media content files having shared rights, and such that the per-subscriber storage architecture exclusively stores media content files having per-subscriber rights.

The RS-DVR system can maintain stored media content files for any amount of time, whether or not a subscriber system requests playback. The illustrated embodiment of the process 540 checks whether a request for playback of a stored media content file is received at the RS-DVR system (query task 552). If no playback request is received, then the process 540 may exit, return to task 542 to continue receiving media content files, wait for a playback request, or take any appropriate action. This example assumes that a playback request is received. In response to receiving a playback request, the RS-DVR system determines whether the requested media content file has shared rights or per-subscriber rights (query task 554). Alternatively or additionally, the process 540 may check whether the requesting subscriber system or the requesting user has shared or per-subscriber access rights. The requested media content file is accessed from the shared storage architecture (task 556) or from the per-subscriber storage architecture (task 558) as appropriate. The accessed media content file can then be provided to the requesting subscriber system for playback (task 560).

Late Assignment of Recorded Content

A DVR system that services multiple subscriber systems (such as an RS-DVR system) may record programs on demand at the request of the subscriber systems and/or at the request of the subscribers via some means other than the subscriber systems themselves. Thus, when a subscriber records a program, the corresponding recorded media content file is assigned to that particular subscriber at the time of recording. Such one-to-one file assignment can be used to ensure that only one subscriber (i.e., the one that requested recording) can access any stored media content file. Although this one-to-one approach is intuitive and easy to implement, it can result in wasted storage space when a large volume of programs are recorded but never played back.

As an alternative to the typical one-to-one file storage approach, an RS-DVR system as described here may employ a late assignment or "late binding" scheme that does not assign recorded media content files to subscribers at the time of recording. Rather, the late assignment scheme assigns recorded media content files to subscribers at the time of playback. After a recorded media content file is assigned to a given subscriber in this manner, that subscriber can request playback of that media content file on his or her subscriber system (or, if that particular subscriber owns multiple "eligible" subscriber systems, playback to any eligible subscriber system may be requested). To support a plurality of different subscribers, multiple copies of a given media content file can still be created and stored in a "pool" that is used to serve copies of the stored content at the time of playback request. In this regard, the storage architecture 310 of the RS-DVR system 300 shown in FIG. 3 could be used to anticipatorily store a plurality of recorded versions of a given media content file without actually assigning any of the recorded versions to any of the subscribers. The reserved pool of recorded copies can be maintained in the storage architecture 310 in an unassigned state until a subscriber system or a subscriber requests playback. The file system module 306 and the storage architecture 310 can therefore cooperate to assign recorded versions of media content files to the subscribers in response to receiving requests for playback.

Figure 11:
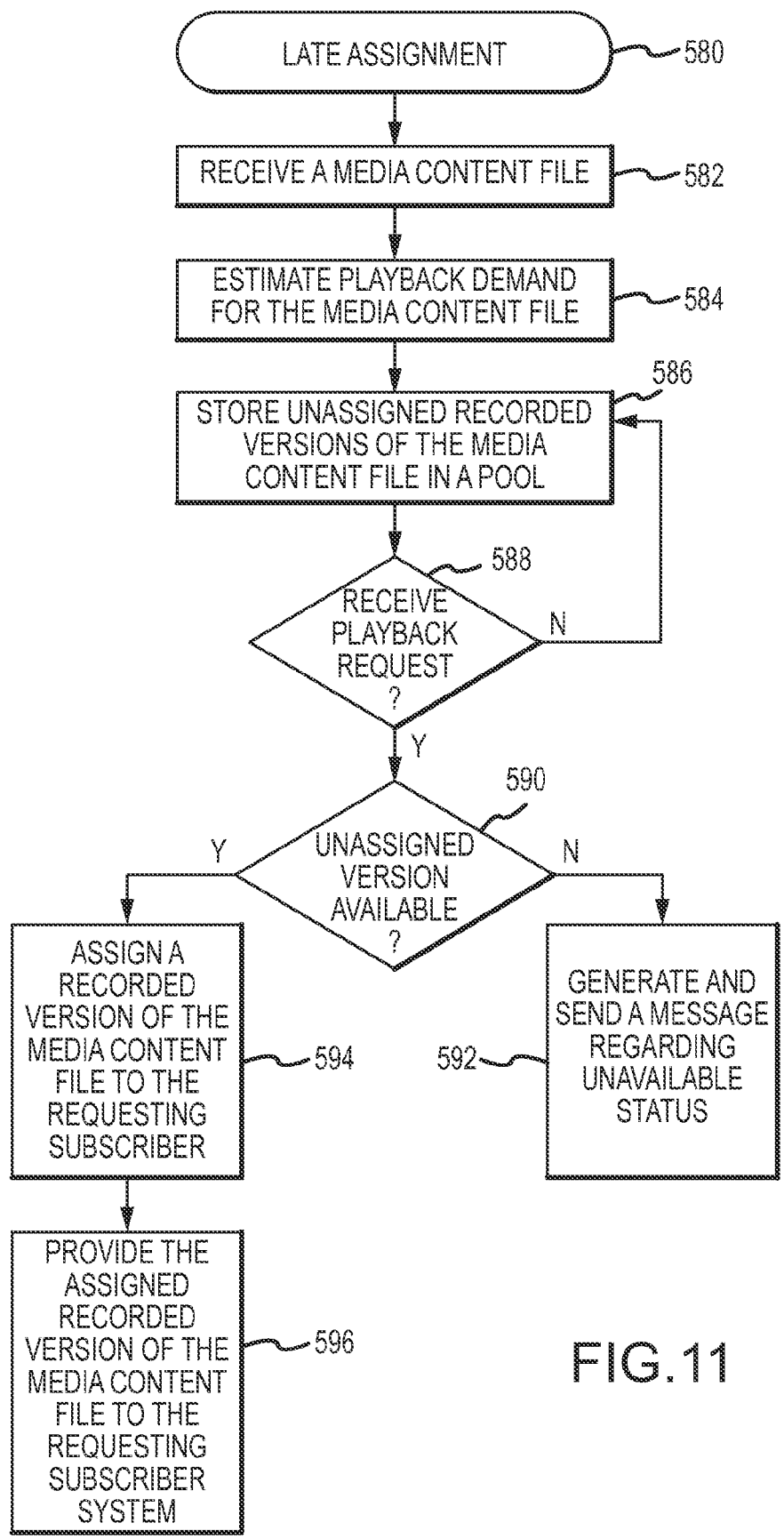
FIG. 11 is a flow chart that illustrates an exemplary embodiment of a late assignment process of an RS-DVR system.

FIG. 11 is a flow chart that illustrates an exemplary embodiment of a late assignment process 580, which may be performed by an RS-DVR system of the type described here. The RS-DVR receives a media content file (task 582) that is subject to recording. The media content file may be in the form of encoded media segments corresponding to different bitrates, as described above. For simplicity, the process 580 is described for only one media content file. In practice, however, the process 580 can be performed to record any number of different media content files.

For this particular embodiment, the RS-DVR system estimates the future playback demand for the media content file (task 584). In this regard, the RS-DVR system may estimate the amount of playback requests for the media content file to be received from different subscribers. The predicted number of playback requests can then be used to determine how many instantiations of the media content file should be saved. In practice, the estimation performed by the RS-DVR system could be based on any number of factors, metrics, or parameters. For example, the predicted number of playback requests may be based upon usage statistics for the plurality of subscribers and/or usage statistics for the subscriber systems, e.g., recording and playback statistics for the different subscribers, the frequency of playback for similar content, the frequency of playback for content delivered on certain channels, the popularity of the genre of the media content, the percentage (per subscriber or collectively) of historically recorded content that actually gets played back, and the like. As another example, the estimating may be based upon programming or viewing statistics for the media content file itself. In this regard, the RS-DVR system could be provided with access to ratings information, recording data for other time zones, or other information that is specific to the particular media content file.

The process 580 may continue by storing a plurality of recorded versions of the media content file in the storage architecture without assigning any of the recorded versions to any of the subscribers at the time of storing (task 586). Notably, at least the predicted number (obtained from the estimation of task 584) of unassigned recorded versions are stored and maintained in a pool of unassigned files. The RS-DVR system maintains this pool of unassigned recorded versions of the media content file until they are erased, where typically the erase decision is made as a function of how old the media content is. It also may be that over time some of the media content files in the pool are erased early due to minimal demand from subscribers. This example assumes that the RS-DVR system eventually receives a request for playback of the media content file, where the request originates from one of the supported subscriber systems or from another system or device that is being operated by a subscriber (the "YES" branch of query task 588).

In response to receiving the playback request, the RS-DVR system may determine whether any unassigned recorded versions of the media content file remain in the pool (query task 590). If not, then the RS-DVR system takes appropriate action. For example, the RS-DVR system may generate and send a message, a notification, or a status code to the requesting subscriber system to indicate that the requested media content file is unavailable (task 592). Although this scenario is unlikely if the estimation of task 584 is accurate, the process 580 should contemplate this situation and respond accordingly. If at least one unassigned version of the requested media content file is available in the pool, the RS-DVR system assigns one of the unassigned recorded versions of the media content file to the requesting subscriber, which results in an assigned recorded version (task 594). In certain embodiments, task 594 exclusively assigns one of the unassigned recorded versions of the media content to the requesting subscriber (and/or to the requesting subscriber system), such that no other subscribers can access that particular version. Late assignment of the recorded content in this manner results in the removal of an unassigned recorded version from the pool, or in the conversion of an unassigned recorded version in the pool into an assigned recorded version. The RS-DVR system can then provide the assigned recorded version of the media content file to the requesting subscriber system for presentation or playback (task 596).

The late assignment technique described above still requires the user to initiate the recording requests. To maintain consistency with legacy DVR systems and copyright law precedence, the late assignment technique can be performed in a transparent manner while still allowing end users to believe that they are actually controlling and initiating the recording function. For example, activation of the "record" button on a subscriber's remote control is still required prior to the actual transmission of the program, like it has to happen with a DVR. A difference is that the user is not assigned to a specific copy of the program until the activation of the "play" button.

The above example assumes that the file assignment occurs at the time of playback. Alternatively, the RS-DVR system could be configured to convert one of the unassigned recorded versions of the media content file into an assigned recorded version for a particular subscriber, even though playback is not immediately scheduled. In other words, assignment of the media content file could be performed in response to any request for the media content file (e.g., a request from a subscriber system to view a list of recorded content), whether or not immediate playback is also requested.

Storing Multiple Bitrate Versions of Media Content in a Single File

Referring again to FIGS. 3-7, an adaptive rate RS-DVR system is capable of recording and saving multiple bitrate versions of each media content file in the form of multiple sets of encoded media segments. For one exemplary embodiment, ten different bitrates are supported. Consequently, for such an embodiment the storage architecture 310 (FIG. 3) maintains ten different sets of encoded media segments for each media content file. Moreover, multiple instantiations of the ten different sets may need to be maintained to comply with certain per-subscriber storage requirements.

In accordance with an exemplary data storage and file system scheme, the RS-DVR system 300 records the different encoded bitrate versions of a media content file in one logical file. The single logical file can be partitioned for storage in a distributed manner across a plurality of different memory storage devices of the storage architecture 310. This file management scheme can be accomplished by ensuring that the data representing encoded media segments for any particular bitrate is contiguous on a single memory storage device within the logical file structure. The logical file structure may also be arranged such that other video (media) segments of the logical file are stored on different memory storage devices.

In certain scenarios, the single logical file is partitioned such that data representing encoded media segments for different bitrates are stored on different memory storage devices. In other situations, a given memory storage device could be used to store encoded media segments corresponding to different bitrates, even though the stored media segments form part of the same logical file. The beginning of data representing encoded media segments for the different bitrates is located at known or specified offsets (e.g., predefined increments of storage space) to enable the file system module 306 to arrange, manage, and retrieve the encoded media segments for any particular bitrate in an efficient and effective manner, even though the encoded media segments for a given bitrate might be stored on different memory storage devices. The offsets may be any predefined amount of storage space, e.g., 100 MB increments. The offsets may, but need not, correspond to allocation units for the memory storage devices. In practice, the offsets can be used to indicate the locations of nulls and/or the locations of contiguous data representing media segments encoded at a particular bitrate.

In practice, the RS-DVR system may utilize sparse file techniques and technology to enable the file system module 306 to store the multiple bitrate encoded media segments for a given media content file together as one logical file. To this end, the file system module 306 can allocate the different non-contiguous sections of the logical file onto different memory storage devices. Storing different bitrates on different memory storage devices in this manner is useful in dealing with storage device failures or slow or excessively busy storage devices. This file management and storage scheme also improves playback performance and reliability by locating specific bitrate segments contiguously within a single file structure and on the hard disk drives, which in turn facilitates read ahead and increasing disk efficiencies.

Referring again to FIG. 8, the RS-DVR system 300 stores encoded media segments for a given media content file as needed (task 506). In certain embodiments, task 506 is performed such that the encoded media segments are stored as a single logical file across a plurality of different memory storage devices of the storage architecture 310. During playback of a particular media content file at a requested bitrate, the file system module 306 cooperates with the storage architecture 310 to access and retrieve the appropriate encoded media segments. In this regard, the file system module 306 can locate the corresponding logical file for the requested media content file (and for the requesting subscriber system), and then access or retrieve the appropriate media segments by consulting a table or metadata that indicates the offset location(s) for the desired bitrate.

Simplified File Storage And Management

An RS-DVR system as described here could use a very simple storage mechanism for managing disk storage in storing per subscriber adaptive rate video content. In an exemplary embodiment, an index table (or any suitable data arrangement) is kept in memory (and on disk) that maps each disk block containing video to the subscriber, specific content, bitrate, and time offset within the content. The index table (which functions similarly to a file system directory) can be only loosely synchronized with the actual content on the disk, because the storage manager will validate the content when it is read from disk.

Referring again to FIG. 3, each of the memory storage devices (e.g., hard disks) used for the storage architecture 310 of the RS-DVR system 300 is divided into or otherwise defined as a plurality of allocation units configured to store the encoded media segments. In preferred implementations, all of the allocation units throughout the storage architecture 310 have the same predefined size, e.g., 2 MB or whatever arbitrary increment is desired. At least some of the allocations units on any given hard disk will contain stored media segments—such allocation units are referred to herein as "media segment containing" allocation units.

For the exemplary embodiment described here, each hard disk that includes at least one media segment containing allocation unit will also have a respective index table stored thereon. The index table includes entries for the media segment containing allocation units. Accordingly, if a particular hard disk includes some allocation units that do not store any media segments, then the index table for that particular hard disk need not include entries for each and every allocation unit. In preferred deployments, the index table is used to store descriptive data, metadata, or information that characterizes one or more encoded media segments stored in the media segment containing allocation units.

FIG. 12 depicts an exemplary index table 600 for maintaining descriptive data related to encoded media segments. As mentioned above, at least one index table 600 may be stored on each hard disk that contains media segments. Accordingly, the size of the index table 600 is a function of the overall size of the hard disk. The index table 600 may be organized such that it includes descriptive data for each media segment containing allocation unit 602. For example, the descriptive data may include, without limitation: a user identifier 604 corresponding to a subscriber system or a subscriber; a content identifier 606 corresponding to the particular media content file and to the encoded media segment(s) stored in the respective allocation unit; a bitrate identifier 608 that indicates the bitrate corresponding to the encoded media segment(s) stored in the respective allocation unit; and a time index 610 for the encoded media segment(s) stored in the respective allocation unit. It should be appreciated that one allocation unit could be used to store one or more "whole" media segments, one or more "partial" media segments, or any combination thereof. For example, a single allocation unit might be used to store only one encoded media segment, a plurality of media segments, one complete media segment and a portion of a second media segment, a portion of one media segment and a portion of another media segment, etc. Accordingly, the actual content of an allocation unit entry in the index table may describe more than one encoded media segment if needed.

The RS-DVR system 300 (see FIG. 3) can generate, maintain, and update the index tables as needed to reflect ongoing changes to the recorded content stored on the memory storage devices. In preferred embodiments the index table 600 is written at the beginning of the memory storage device to facilitate immediate reading of the index table 600 when the memory storage device is mounted. Notably, any given index table provides a simple self-descriptive summary of the video content stored on its respective memory storage device. The file system module 306 can read and search the various index tables as needed to locate or identify encoded media segments stored in the storage architecture 310. Accordingly, the file system module 306 may consult the index tables to access and retrieve requested media content files for playback.

As mentioned above, each index table describes the media content stored on the respective hard disk, and each index table may be written/updated frequently to continuously track the ongoing changes to the content stored on the hard disk. For example, each index table could be written once every thirty seconds. If a hard disk fails, then its corresponding directory as monitored by the file system module might be out of synchronization with what is actually present on the hard disk. The RS-DVR system 300 employs a consistency check scheme to reduce the negative consequences of such hard disk failures.

In accordance with the exemplary embodiment described here, each allocation unit that includes a stored media segment includes a consistency check field that contains at least some of the descriptive data found in the index table for that particular hard disk. More specifically, the consistency check field for any given allocation unit contains the descriptive data that characterizes the encoded media segments stored in that particular allocation unit. In other words, under normal operating conditions all of the consistency check fields on a hard disk will collectively include the same information that populates the index table.

FIG. 13 is a diagram that depicts an exemplary embodiment of an allocation unit 620 having two consistency check fields 622, 624. The allocation unit 620 includes a first instantiation of the consistency check field 622 located at a beginning section of the allocation unit 620, along with a second instantiation of the consistency check field 624 located at an ending section of the allocation unit 620. During operation of the RS-DVR system 300, the file system module 306 can read one or both of the consistency check fields 622, 624 and compare the data contained therein to the corresponding entry in the index table 600 for that particular allocation unit 620. If the descriptive data matches, then the file system module 306 assumes that the hard disk is operating as expected and that the content of the allocation unit 620 is synchronized with that specified in the index table 600. If, however, the consistency check data is different than the index table data, then the RS-DVR system 300 can take appropriate action. For example, the RS-DVR system 300 may generate and send an appropriate notification or message to the subscriber system such that the subscriber system can request a different bitrate that is supported by properly operating hard disks. The two consistency check fields 622, 624 are located at the beginning and end of the allocation unit 620 so that at least one of the consistency check fields 622, 624 remains intact in the event of an error or failure that occurs while writing video content to the allocation unit 620.

Disk Management Techniques

As described above with reference to FIGS. 3-8, each recording of a media content file includes different encoded bitrate versions of the same video, which allows the adaptive rate RS-DVR system to select between different bitrates in real time during playback. In certain embodiments, the RS-DVR system records the different encoded bitrate versions of the same media content file on different hard disk drives. In practice, the media segment data itself may be divided at disk allocation unit boundaries and each allocation unit may be placed on a different hard disk drive, provided that no other video (of a different bitrate within that time span for that subscriber is also on that same disk). In the event of a disk drive failure, the RS-DVR system can access a different bitrate version that is on a hard disk drive that has not failed. Similarly, in the event that a hard disk drive is either too busy or too slow to retrieve requested media content while maintaining real-time delivery to the requesting subscriber system, the RS-DVR system can access and provide a different bitrate version that is on a disk drive that is not busy or too slow.

Figure 14:
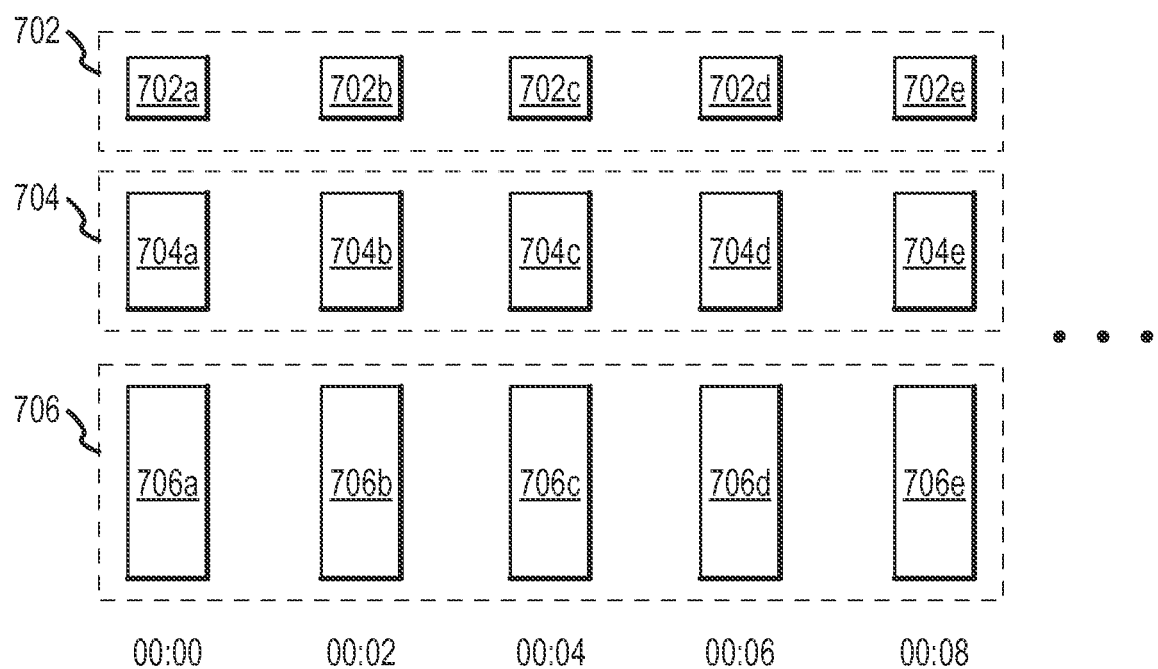
FIG. 14 is a diagram that depicts encoded media segments corresponding to a media content file.

Referring again to FIG. 8, the encoded media segments (at different bitrates) for a recorded media content file are stored in the storage architecture of the RS-DVR system during task 506. In accordance with certain exemplary embodiments, the encoded media segments may include sets that correspond to the different supported bitrates. In this regard, FIG. 14 is a diagram that depicts encoded media segments for a media content file. For simplicity, FIG. 14 depicts three sets of media segments corresponding to three different bitrates: a low bitrate set of media segments 702; an intermediate bitrate set of media segments 704; and a high bitrate set of media segments 706. Each media segment has a respective time range relative to the media content file. In other words, each media segment represents a relatively short time period of the overall media content file; each media segment corresponds to a partial period of playback time of the media content file. Although any individual media segment could have any designated time range, for consistency with the examples described previously, each media segment depicted in FIG. 14 has a two second time range associated therewith. Thus, the leftmost media segment in each set has a time index of 00:00, the next media segment in each set has a time index of 00:02, and so on. Although FIG. 14 only shows five consecutive media segments in each set, it should be appreciated that the actual number of media segments for any given media content file will be dictated by the overall runtime of the video.

Storing of the encoded media segments of a media content file is preferably performed in accordance with a distribution scheme to ensure that encoded media segments having different bitrates and overlapping time ranges are not stored on any common memory storage device. Thus, the RS-DVR system is configured and operated to prevent storage of any encoded media segment together with another encoded media segment having an overlapping partial period of playback time. One way to implement this distribution scheme is to have each set of media segments 702, 704, 706 stored on a different memory storage device. Another way to implement this distribution scheme is to ensure that any given memory storage device only contains one media segment having a particular time index (or time range). Accordingly, this distribution scheme may be influenced by a number of factors such as the different bitrates assigned to the media segments, the time ranges of the media segments, the time indices of the media segments, the identity of the media content file, and the like.

Referring to FIG. 14, the media segments might be stored in a distributed manner as follows. Assume that the RS-DVR system includes twenty six hard disks identified by the letters of the alphabet. If the media segment 702a (which corresponds to the time index 00:00 for the first set of media segments 702) is stored on hard disk "A" then the media segment 704a and the media segment 706a must be stored on two different hard disks other than hard disk "A". In other words, the media segments 702a, 704a, 706a are distributed across three physically distinct and different hard disks. In contrast, the media segment 704b (which corresponds to the time index 00:02 for the second set of media segments 704) could be stored on hard disk "A" because the time ranges of the media segment 702a and the media segment 704b do not overlap. A practical deployment of the RS-DVR system might use hundreds of distinct hard disk drives, which makes it easy to store media segments in a distributed manner with little to no conflicts.

Storage of the media segments in accordance with a distributed scheme enables the RS-DVR system to quickly and effectively respond to hard disk failures, hard disk errors, and otherwise unsatisfactory hard disk performance. For example, in response to receiving a request for playback of a media content file (see query task 508 of the process 500 depicted in FIG. 8), the RS-DVR system can determine whether the memory storage devices can maintain real-time delivery of the encoded media segments having the requested bitrate. This determination could be performed by the file system module 306 and/or the processing logic module 302 (see FIG. 3) while monitoring the performance of the storage architecture 310. If the RS-DVR system determines that performance of a memory storage device is unsatisfactory, then the RS-DVR system can take appropriate action. For example, the RS-DVR system could generate an HTTP status code, generate and send a message intended for the requesting subscriber system, or take other action as described above with reference to the process 520 illustrated in FIG. 9.

As used here, "unsatisfactory performance" for a memory storage device contemplates: a complete or temporary failure of a memory storage device; operation of a memory storage device below a threshold speed that is required to maintain real-time delivery of the encoded media segments having the requested bitrate; operation of a memory storage device at a workload level that causes the device to be too busy to maintain real-time delivery of the encoded media segments having the requested bitrate; or the like. Notably, the distributed storage scheme outlined above allows the RS-DVR system to address unsatisfactory hard disk performance by temporarily bypassing that particular hard disk to access one or more good hard disks that maintain the same video content (having some media segments encoded at a bitrate other than the requested bitrate). In other words, distributing the media segments across a plurality of distinct memory storage devices enables the RS-DVR system to "sacrifice" one (or more) hard disks while still being able to deliver the requested media content file to the requesting subscriber system.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A remote storage digital video recorder (RS-DVR) system comprising:
    a network interface to communicate data between the RS-DVR system and a plurality of subscriber systems via a network, the plurality of subscriber systems providing media content to a plurality of subscribers;
    a file system module coupled to the network interface;
    an ingest agent coupled to the file system module to receive media content files, the media content files including shared rights media content files and per-subscriber rights media content files;
    a processing logic module to determine, for each media content file of the received media content files, whether the respective media content file comprises a shared rights media content file having shared rights or a per-subscriber rights media content file that does not have shared rights, resulting in shared rights media content files of the received media content files and per-subscriber rights media content files of the received media content files;
    a shared storage architecture coupled to the file system to store the shared rights media content files, each of the stored shared rights media content files comprising a shared instantiation of one or more encoded media segments representing a recorded version of a respective shared rights media content file that is stored on behalf of a plurality of different subscribers of the plurality of subscribers; and
    a per-subscriber storage architecture coupled to the file system to store the per-subscriber rights media content files, each of the stored per-subscriber rights media content files comprising a separate instantiation of one or more encoded media segments representing a recorded version of a respective per-subscriber rights media content file that is stored on behalf of an individual subscriber of the plurality of subscribers and only accessible by that individual subscriber.

2. The RS-DVR system of claim 1, wherein the shared storage architecture exclusively stores the shared rights media content files without storing any of the per-subscriber rights media content files.

3. The RS-DVR system of claim 1, wherein the per-subscriber storage architecture exclusively stores the per-subscriber rights media content files without storing any of the shared rights media content files.

4. The RS-DVR system of claim 1, wherein the shared storage architecture is physically distinct and separated from the per-subscriber storage architecture.

5. The RS-DVR system of claim 4, wherein:
    the shared storage architecture exclusively stores the shared rights media content files without storing any of the per-subscriber rights media content files; and
    the per-subscriber storage architecture exclusively stores the per-subscriber rights media content files without storing any of the shared rights media content files.

6. The RS-DVR system of claim 1, further comprising a content rights management module to determine whether a requested media content file has shared rights or per-subscriber rights.

7. The RS-DVR system of claim 6, wherein:
    the requested media content file is accessed from the shared storage architecture when the content rights management module determines that the requested media content file has shared rights; and
    the requested media content file is accessed from the per-subscriber storage architecture when the content rights management module determines that the requested media content file has per-subscriber rights.

8. The RS-DVR system of claim 1, further comprising a content rights management module to determine whether a subscriber system requesting a media content file has shared rights or per-subscriber rights.

9. The RS-DVR system of claim 8, wherein:
    the requested media content file is accessed from the shared storage architecture when the content rights management module determines that the subscriber system requesting the media content file has shared rights; and
    the requested media content file is accessed from the per-subscriber storage architecture when the content rights management module determines that the subscriber system requesting the media content file has per-subscriber rights.

10. A method of operating a remote storage digital video recorder (RS-DVR) system that supports a plurality of subscriber systems via data communication over a network, the plurality of subscriber systems configured to provide media content to a plurality of subscribers, the method comprising:
    receiving, at the RS-DVR system, shared rights media content files and per-subscriber rights media content files;
    storing the shared rights media content files in a shared storage architecture of the RS-DVR system, the storing comprising, for each of the shared rights media content files, storing a shared instantiation of one or more encoded media segments representing a recorded version of a respective shared rights media content file in the shared storage architecture on behalf of a plurality of different subscribers of the plurality of subscribers;
    storing the per-subscriber rights media content files in a per-subscriber storage architecture of the RS-DVR system, the storing comprising, for each of the per-subscriber rights media content files, storing a separate instantiation of one or more encoded media segments representing a recorded version of a respective per-subscriber rights media content file in the per-subscriber storage architecture on behalf of an individual subscriber of the plurality of subscribers, wherein each separate instantiation only accessible by that individual subscriber of the plurality of subscribers;

receiving, at the RS-DVR system, an instruction to record a requested media content file on behalf of a requesting subscriber;

determining, at the RS-DVR system, whether the requested media content file has shared rights or per-subscriber rights;

storing the requested media content file in the per-subscriber storage architecture on behalf of the requesting subscriber when the determining step determines that the requested media content file has per-subscriber rights; and storing the requested media content file in the shared storage architecture when the determining step determines that the requested media content file has shared rights.

11. The method of claim 10, wherein storing the shared rights media content files is performed without storing any of the per-subscriber rights media content files in the shared storage architecture.

12. The method of claim 10, wherein storing the per-subscriber rights media content files is performed without storing any of the shared rights media content files in the per-subscriber storage architecture.

13. The method of claim 10, further comprising:

receiving, at the RS-DVR system, a request for playback of a requested media content file; and determining, at the RS-DVR system, whether the requested media content file has shared rights or per-subscriber rights.

14. The method of claim 13, wherein:

the requested media content file is accessed from the shared storage architecture when the determining step determines that the requested media content file has shared rights; and the requested media content file is accessed from the per-subscriber storage architecture when the determining step determines that the requested media content file has per-subscriber rights.

15. The method of claim 10, wherein:

storing the shared rights media content files comprises exclusively storing the shared rights media content files without storing any of the per-subscriber rights media content files in a first disk drive that is physically distinct and separate from the per-subscriber storage architecture; and storing the per-subscriber rights media content files comprises exclusively storing the per-subscriber rights media content files in a second disk drive that is physically distinct and separate from the shared storage architecture.

16. A method of operating a remote storage digital video recorder (RS-DVR) system that supports a plurality of subscriber systems via data communication over a network, the plurality of subscriber systems providing media content to a plurality of subscribers, the method comprising:

receiving, at the RS-DVR system, media content files;

obtaining, at the RS-DVR system, an instruction to record a requested media content file of the received media content files;

determining, at the RS-DVR system, whether the requested media content file of the received media content files has shared rights or per-subscriber rights;

storing the requested media content file in a shared storage architecture of the RS-DVR system when the determining step determines that the requested media content file has shared rights, the storing comprising storing a shared instantiation of one or more encoded media segments representing a recorded version of the requested media content file in the shared storage architecture on behalf of a plurality of different subscribers of the plurality of subscribers; and storing the requested media content file in a per-subscriber storage architecture of the RS-DVR system when the determining step determines that the requested media content file has per-subscriber rights, the storing comprising storing an instantiation of the one or more encoded media segments representing the recorded version of the requested media content file in the per-subscriber storage architecture on behalf of an individual subscriber of the plurality of subscribers that is only accessible by that individual subscriber of the plurality of subscribers.

17. The method of claim 16, wherein each of the media content files comprises a plurality of encoded media segments that represent the media content file encoded at a plurality of different bitrates.

18. The method of claim 16, further comprising:

managing the shared storage architecture such that the shared storage architecture exclusively stores media content files having shared rights; and managing the per-subscriber storage architecture such that the per-subscriber storage architecture exclusively stores media content files having per-subscriber rights.

* * * * *